United States Patent
Yan et al.

(10) Patent No.: US 12,526,789 B2
(45) Date of Patent: Jan. 13, 2026

(54) COMMUNICATION METHOD AND APPARATUS

(71) Applicant: HUAWEI TECHNOLOGIES CO., LTD., Guangdong (CN)

(72) Inventors: Zhongjiang Yan, Xi'an (CN); Biao Chen, Xi'an (CN); Xiao Han, Shenzhen (CN); Yan Xin, Ottawa (CA); Mengyao Ma, Shenzhen (CN); Yunbo Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 628 days.

(21) Appl. No.: 17/727,061

(22) Filed: Apr. 22, 2022

(65) Prior Publication Data

US 2022/0248427 A1      Aug. 4, 2022

Related U.S. Application Data

(63) Continuation of application No. PCT/CN2020/122963, filed on Oct. 22, 2020.

(30) Foreign Application Priority Data

Oct. 24, 2019   (CN) .......................... 201911019233.5

(51) Int. Cl.
*H04W 72/1263*      (2023.01)

(52) U.S. Cl.
CPC ............................... *H04W 72/1263* (2013.01)

(58) Field of Classification Search
CPC ............. H04W 72/1263; H04W 72/20; H04W 72/0446; H04W 84/12
See application file for complete search history.

(56) References Cited

U.S. PATENT DOCUMENTS

| | | | |
|---|---|---|---|
| 8,971,306 B1 * | 3/2015 | Loc ...................... | H04W 72/04 370/431 |
| 10,757,723 B2 * | 8/2020 | Huang .................. | H04L 5/0048 |
| 2016/0174253 A1 | 6/2016 | Liu et al. | |

(Continued)

FOREIGN PATENT DOCUMENTS

| | | | | |
|---|---|---|---|---|
| CN | 109391455 A | 2/2019 | | |
| WO | WO-2014171895 A1 * | 10/2014 | ............ | H04W 16/10 |

OTHER PUBLICATIONS

Mohamed Ehab Mahmoud, WiFi Assisted Multi WiGig APCoordination for Future Multi Gbps WLANs 2015 IEEE 26th International Symposium on Personal Indoor and Mobile RadioCommunications (PIMRC):Mobile and Wireless Networks 31 .12, 2015, 6 pages.

*Primary Examiner* — Joseph E Avellino
*Assistant Examiner* — Anindita Sen
(74) *Attorney, Agent, or Firm* — WOMBLE BOND DICKINSON (US) LLP

(57) ABSTRACT

A communication method and apparatus are provided, which relate to the field of communication technologies, to determine an interaction procedure in an ATI in an AP coordination scenario. The method includes: A C-AP generates a first indication frame, where the first indication frame indicates an interaction procedure between an M-AP, the C-AP, and a STA in the ATI; and the C-AP sends the first indication frame to a plurality of M-APs, so that the plurality of M-APs perform the interaction procedure in the ATI based on the first indication frame.

19 Claims, 16 Drawing Sheets

(56) References Cited

U.S. PATENT DOCUMENTS

| | | | |
|---|---|---|---|
| 2016/0330684 A1* | 11/2016 | Sinha | H04W 52/0209 |
| 2017/0318621 A1 | 11/2017 | Irie et al. | |
| 2019/0041509 A1* | 2/2019 | Jiang | H04W 24/10 |
| 2019/0208463 A1 | 7/2019 | Lou et al. | |
| 2019/0239287 A1* | 8/2019 | Huang | H04W 88/10 |
| 2019/0254066 A1 | 8/2019 | Ma et al. | |
| 2020/0213160 A1* | 7/2020 | Doostnejad | H04L 25/022 |
| 2020/0304173 A1* | 9/2020 | Chu | H04W 72/0453 |
| 2021/0126988 A1* | 4/2021 | Alex | H04W 72/54 |
| 2021/0168816 A1* | 6/2021 | Atefi | H04W 76/10 |
| 2021/0235486 A1* | 7/2021 | Atefi | H04W 52/0235 |
| 2021/0385779 A1* | 12/2021 | Oteri | H04B 7/024 |
| 2023/0145283 A1* | 5/2023 | Chu | H04W 72/0453 370/329 |

* cited by examiner

| Frame control | Duration | Receiving address | Transmitting address | Dynamic allocation information | Beamforming control | Frame check sequence |
|---|---|---|---|---|---|---|

FIG. 7

| Frame control | Duration | Receiving address | Transmitting address | Dynamic allocation information | Beamforming control | Frame check sequence |
|---|---|---|---|---|---|---|

FIG. 8

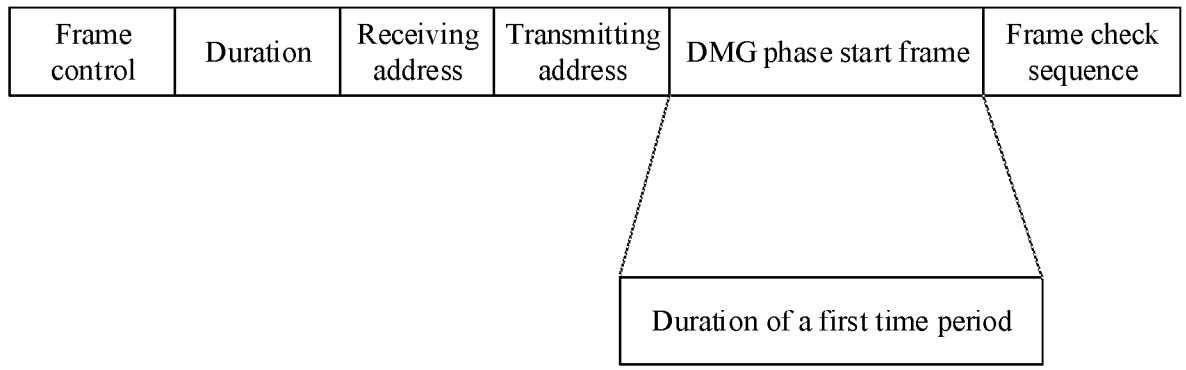
FIG. 10
| AID | First indication information | Start time of a first time period | Duration of the first time period | Second indication information | Start time of a second time period | Duration of the second time period |
FIG. 11
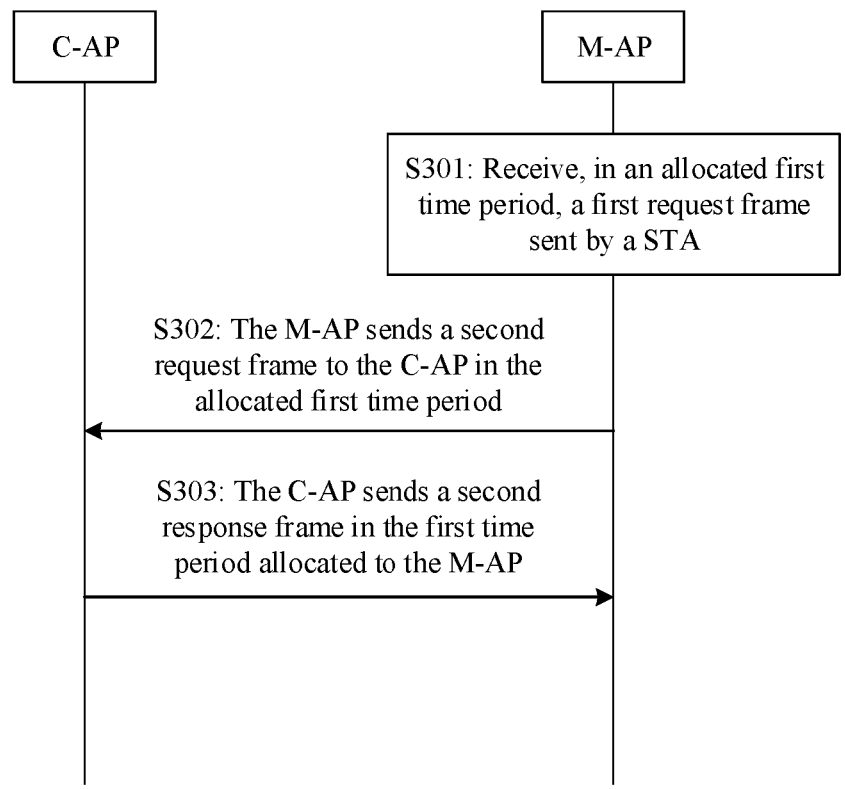
FIG. 12

| AID | First indication information | Start time of a first time period | Duration of the first time period |

COMMUNICATION METHOD AND APPARATUS

CROSS-REFERENCE TO RELATED APPLICATIONS

This application is a continuation of International Application No. PCT/CN2020/122963, filed on Oct. 22, 2020, which claims priority to Chinese Patent Application No. 201911019233.5, filed on Oct. 24, 2019. The disclosures of the aforementioned applications are hereby incorporated by reference in their entireties.

TECHNICAL FIELD

This application relates to the communication field, and in particular, to a communication method and apparatus.

BACKGROUND

High-frequency Wi-Fi is an important direction of wireless networks in the future and has attracted increasing attention. High-frequency signals are attenuated excessively fast with an increasing distance, resulting in limited coverage of one AP. In addition, because a wireless local area network (WLAN) technology is popularized continuously, wireless access points (AP) are increasingly densely deployed. Therefore, to prevent interference between a plurality of APs and improve quality of service for a user, coordinating, by a plurality of APs, with each other to serve a STA jointly becomes a valuable research topic.

Currently, in an AP coordination scenario, the industry does not provide a specific procedure in an announcement transmission interval (ATI).

SUMMARY

This application provides a communication method and apparatus, to determine a specific procedure in an ATI in an AP coordination scenario.

According to a first aspect, this application provides a communication method. The method includes: A first AP generates a first indication frame, where the first indication frame indicates to perform an interaction procedure between the first AP, a second AP, and a station (STA) in an ATI; and the first AP sends the first indication frame to a plurality of second APs.

Based on the foregoing technical solution, the first AP sends the first indication frame to the plurality of second APs, so that the second APs can determine the interaction procedure between the first AP, a second AP, and a STA in an ATI, to ensure normal execution in the ATI.

In an embodiment, the first indication frame includes scheduling mode indication information, the scheduling mode indication information indicates a scheduling mode, and different scheduling modes correspond to different interaction procedures.

In an embodiment, the scheduling mode includes a first scheduling mode, a second scheduling mode, and a third scheduling mode.

In an embodiment, based on the first scheduling mode, the interaction procedure between the first AP, a second AP, and a STA includes: Each second AP receives, in a corresponding first time period, one or more first request frames sent by one or more STAs; each second AP sends a second request frame to the first AP in a second time period; and the first AP sends a second response frame to each second AP in the second time period. The first request frame indicates a service demand of the STA that sends the first request frame, the second request frame indicates one or more service demands of the one or more STAs, and the second response frame is for responding to the second request frame. Based on this design, the second response frame delivered by the first AP is determined based on the first request frame sent by each second AP. Therefore, the second response frame delivered by the first AP is based on overall consideration, and can meet a service demand of each STA.

In an embodiment, the first indication frame further includes a plurality of pieces of AP scheduling information, and the plurality of pieces of AP scheduling information one-to-one correspond to the plurality of second APs. The AP scheduling information includes an association identifier (AID), first indication information, start time of the first time period, duration of the first time period, second indication information, start time of the second time period, and duration of the second time period. The first indication information indicates whether the second AP obtains the first request frame in a polling manner, and the second indication information indicates whether the first AP obtains the second request frame in a polling manner.

In an embodiment, based on the second scheduling mode, the interaction procedure between the first AP, a second AP, and a STA includes: The second AP receives, in a corresponding first time period, a first request frame sent by the STA; the second AP sends a second request frame to the first AP in the corresponding first time period; and the first AP sends a second response frame each time after receiving a second request frame. The first request frame indicates a service demand of the STA that sends the first request frame, the second request frame indicates one or more service demands of one or more STAs, and the second response frame is for responding to the second request frame. Based on this design, the first AP sends a second response frame each time after receiving a second request frame, to meet a service demand of the STA in a timely manner.

In an embodiment, based on the third scheduling mode, the interaction procedure between the first AP, a second AP, and a STA includes: The second AP receives, in a corresponding first time period, a first request frame sent by the STA; the second AP sends a second request frame to the first AP in the corresponding first time period; and the first AP sends a second response frame in a second time period. The first request frame indicates a service demand of the STA that sends the first request frame, the second request frame indicates one or more service demands of one or more STAs, and the second response frame is for responding to the second request frame. Based on this design, the second response frame delivered by the first AP is determined based on the first request frame sent by each second AP. Therefore, the second response frame delivered by the first AP is based on overall consideration, and can meet a service demand of each STA.

In an embodiment, the first indication frame further includes a plurality of pieces of AP scheduling information, and the plurality of pieces of AP scheduling information one-to-one correspond to the plurality of second APs. The AP scheduling information includes an AID, first indication information, start time of the first time period, and duration of the first time period. The first indication information indicates whether the second AP obtains the first request frame in a polling manner.

According to a second aspect, this application provides a communication method. The method includes: A second AP receives a first indication frame sent by a first AP, where the first indication frame indicates to perform an interaction procedure between the first AP, the second AP, and a STA in an announcement transmission interval ATI; and the second AP performs the interaction procedure based on the first indication frame.

In an embodiment, the first indication frame includes scheduling mode indication information, the scheduling mode indication information indicates a scheduling mode, and different scheduling modes correspond to different interaction procedures.

In an embodiment, the scheduling mode includes a first scheduling mode, a second scheduling mode, and a third scheduling mode.

In an embodiment, based on the first scheduling mode, the interaction procedure between the first AP, the second AP, and a STA includes: Each second AP receives, in a corresponding first time period, one or more first request frames sent by one or more STAs; each second AP sends a second request frame to the first AP in a second time period; and the first AP sends a second response frame to each second AP in the second time period. The first request frame indicates a service demand of the STA that sends the first request frame, the second request frame indicates one or more service demands of the one or more STAs, and the second response frame is for responding to the second request frame.

In an embodiment, the first indication frame further includes a plurality of pieces of AP scheduling information, and the plurality of pieces of AP scheduling information one-to-one correspond to the plurality of second APs. The AP scheduling information includes an AID, first indication information, start time of the first time period, duration of the first time period, second indication information, start time of the second time period, and duration of the second time period. The first indication information indicates whether the second AP obtains the first request frame in a polling manner, and the second indication information indicates whether the first AP obtains the second request frame in a polling manner.

In an embodiment, based on the second scheduling mode, the interaction procedure between the first AP, the second AP, and a STA includes: The second AP receives, in a corresponding first time period, a first request frame sent by the STA; the second AP sends a second request frame to the first AP in the corresponding first time period; and the first AP sends a second response frame each time after receiving a second request frame. The first request frame indicates a service demand of the STA that sends the first request frame, the second request frame indicates one or more service demands of one or more STAs, and the second response frame is for responding to the second request frame.

In an embodiment, based on the third scheduling mode, the interaction procedure between the first AP, the second AP, and a STA includes: The second AP receives, in a corresponding first time period, a first request frame sent by the STA; the second AP sends a second request frame to the first AP in the corresponding first time period; and the first AP sends a second response frame in a second time period. The first request frame indicates a service demand of the STA that sends the first request frame, the second request frame indicates one or more service demands of one or more STAs, and the second response frame is for responding to the second request frame.

In an embodiment, the first indication frame further includes a plurality of pieces of AP scheduling information, and the plurality of pieces of AP scheduling information one-to-one correspond to the plurality of second APs. The AP scheduling information includes an AID, first indication information, start time of the first time period, and duration of the first time period. The first indication information indicates whether the second AP obtains the first request frame in a polling manner.

In an embodiment, the method further includes: The second AP sends a first response frame to the STA. The first response frame is for responding to the first request frame, the first response frame includes a plurality of pieces of STA information, the plurality of pieces of STA information one-to-one correspond to a plurality of STAs, and the STA information indicates an address of each AP that serves a STA corresponding to the STA information.

According to a third aspect, this application provides a communication apparatus, including: a processing module, configured to generate a first indication frame, where the first indication frame indicates an interaction procedure between a first AP, a second AP, and a STA in an ATI; and a communication module, configured to send the first indication frame to a plurality of second APs.

In an embodiment, the first indication frame includes scheduling mode indication information, the scheduling mode indication information indicates a scheduling mode, and different scheduling modes correspond to different interaction procedures.

In an embodiment, the scheduling mode includes a first scheduling mode, a second scheduling mode, and a third scheduling mode.

In an embodiment, based on the first scheduling mode, the interaction procedure between a first AP, a second AP, and a STA includes: Each second AP receives, in a corresponding first time period, one or more first request frames sent by one or more STAs; each second AP sends a second request frame to the first AP in a second time period; and the first AP sends a second response frame to each second AP in the second time period. The first request frame indicates a service demand of the STA that sends the first request frame, the second request frame indicates one or more service demands of one or more STAs, and the second response frame is for responding to the second request frame.

In an embodiment, the first indication frame further includes a plurality of pieces of AP scheduling information, and the plurality of pieces of AP scheduling information one-to-one correspond to the plurality of second APs. The AP scheduling information includes an AID, first indication information, start time of the first time period, duration of the first time period, second indication information, start time of the second time period, and duration of the second time period. The first indication information indicates whether the second AP obtains the first request frame in a polling manner, and the second indication information indicates whether the first AP obtains the second request frame in a polling manner.

In an embodiment, based on the second scheduling mode, the interaction procedure between a first AP, a second AP, and a STA includes: The second AP receives, in a corresponding first time period, a first request frame sent by the STA; the second AP sends a second request frame to the first AP in the corresponding first time period; and the first AP sends a second response frame each time after receiving a second request frame. The first request frame indicates a service demand of the STA that sends the first request frame, the second request frame indicates one or more service demands of one or more STAs, and the second response frame is for responding to the second request frame.

In an embodiment, based on the third scheduling mode, the interaction procedure between a first AP, a second AP, and a STA includes: The second AP receives, in a corresponding first time period, a first request frame sent by the STA; the second AP sends a second request frame to the first AP in the corresponding first time period; and the first AP sends a second response frame in a second time period. The first request frame indicates a service demand of the STA that sends the first request frame, the second request frame indicates one or more service demands of one or more STAs, and the second response frame is for responding to the second request frame.

In an embodiment, the first indication frame further includes a plurality of pieces of AP scheduling information, and the plurality of pieces of AP scheduling information one-to-one correspond to the plurality of second APs. The AP scheduling information includes an AID, first indication information, start time of the first time period, and duration of the first time period. The first indication information indicates whether the second AP obtains the first request frame in a polling manner.

According to a fourth aspect, this application provides a communication apparatus, including: a communication module, configured to receive a first indication frame sent by a first AP, where the first indication frame indicates to perform an interaction procedure between the first AP, a second AP, and a STA in an ATI; and a processing module, configured to perform the interaction procedure based on the first indication frame.

In an embodiment, the first indication frame includes scheduling mode indication information, the scheduling mode indication information indicates a scheduling mode, and different scheduling modes correspond to different interaction procedures.

In an embodiment, the scheduling mode includes a first scheduling mode, a second scheduling mode, and a third scheduling mode.

In an embodiment, based on the first scheduling mode, the interaction procedure between the first AP, a second AP, and a STA includes: Each second AP receives, in a corresponding first time period, one or more first request frames sent by one or more STAs; each second AP sends a second request frame to the first AP in a second time period; and the first AP sends a second response frame to each second AP in the second time period. The first request frame indicates a service demand of the STA that sends the first request frame, the second request frame indicates one or more service demands of the one or more STAs, and the second response frame is for responding to the second request frame.

In an embodiment, the first indication frame further includes a plurality of pieces of AP scheduling information, and the plurality of pieces of AP scheduling information one-to-one correspond to the plurality of second APs. The AP scheduling information includes an AID, first indication information, start time of the first time period, duration of the first time period, second indication information, start time of the second time period, and duration of the second time period. The first indication information indicates whether the second AP obtains the first request frame in a polling manner, and the second indication information indicates whether the first AP obtains the second request frame in a polling manner.

In an embodiment, based on the second scheduling mode, the interaction procedure between the first AP, a second AP, and a STA includes: The second AP receives, in a corresponding first time period, a first request frame sent by the STA; the second AP sends a second request frame to the first AP in the corresponding first time period; and the first AP sends a second response frame each time after receiving a second request frame. The first request frame indicates a service demand of the STA that sends the first request frame, the second request frame indicates one or more service demands of one or more STAs, and the second response frame is for responding to the second request frame.

In an embodiment, based on the third scheduling mode, the interaction procedure between the first AP, a second AP, and a STA includes: The second AP receives, in a corresponding first time period, a first request frame sent by the STA; the second AP sends a second request frame to the first AP in the corresponding first time period; and the first AP sends a second response frame in a second time period. The first request frame indicates a service demand of the STA that sends the first request frame, the second request frame indicates one or more service demands of the one or more STAs, and the second response frame is for responding to the second request frame.

In an embodiment, the first indication frame further includes a plurality of pieces of AP scheduling information, and the plurality of pieces of AP scheduling information one-to-one correspond to the plurality of second APs. The AP scheduling information includes an AID, first indication information, start time of the first time period, and duration of the first time period. The first indication information indicates whether the second AP obtains the first request frame in a polling manner.

In an embodiment, the communication module is further configured to send a first response frame to the STA. The first response frame is for responding to the first request frame, the first response frame includes a plurality of pieces of STA information, the plurality of pieces of STA information one-to-one correspond to a plurality of STAs, and the STA information indicates an address of each AP that serves a STA corresponding to the STA information.

According to a fifth aspect, a communication apparatus is provided, including a processor and a communication interface. The processor is configured to execute computer instructions, to implement any method provided in the first aspect or the second aspect. The communication interface is configured to perform a receiving/sending action in a corresponding method.

In an embodiment, the communication apparatus further includes a memory. The processor is coupled to the memory, and the memory is configured to store the computer instructions.

In an embodiment, the memory and the processor are integrated together, or the memory and the processor are independent components.

According to a sixth aspect, a communication apparatus is provided, including a logic circuit and an output interface. The logic circuit and the output interface are configured to implement any method provided in the first aspect or the second aspect. The logic circuit is configured to perform a processing action in a corresponding method, and the output interface is configured to perform a receiving/sending action in a corresponding method.

According to a seventh aspect, a chip is provided, including a processing circuit and a transceiver pin. The processing circuit and the transceiver pin are configured to implement any method provided in the first aspect or the second aspect. The processing circuit is configured to perform a processing action in a corresponding method, and the transceiver pin is configured to perform a receiving/sending action in a corresponding method.

According to an eighth aspect, a computer-readable storage medium is provided. The computer-readable storage medium stores computer instructions. When the computer instructions are run on a computer, the computer is enabled to perform any method provided in the first aspect or the second aspect.

According to a ninth aspect, a computer program product including computer instructions is provided. When the computer instructions are run on a computer, the computer is enabled to perform any method provided in the first aspect or the second aspect.

According to a tenth aspect, a communication system is provided, including a C-AP and an M-AP. The C-AP is configured to perform the method in any design in the first aspect. The M-AP is configured to perform the method in any design in the second aspect.

It should be noted that, for a technical effect brought by any design of the third aspect to the tenth aspect, refer to a technical effect brought by a corresponding design of the first aspect or the second aspect. Details are not described herein again.

BRIEF DESCRIPTION OF DRAWINGS

FIG. 7 is a schematic diagram depicting a frame structure of an SPR frame according to an embodiment of this application;

FIG. 8 is a schematic diagram depicting a frame structure of a polling frame according to an embodiment of this application;

FIG. 10 is a schematic diagram depicting a frame structure of a second indication frame according to an embodiment of this application;

FIG. 11 is schematic diagram 1 depicting a structure of AP scheduling information in a first indication frame according to an embodiment of this application;

FIG. 12 is a flowchart depicting a procedure in an ATI based on a second scheduling mode according to an embodiment of this application;

DESCRIPTION OF EMBODIMENTS

In description of this application, unless otherwise specified, "/" means "or". For example, A/B may represent A or B. The term "and/or" in this specification describes only an association relationship between associated objects and represents that three relationships may exist. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and do not indicate a definite difference.

It should be noted that, in this application, words such as "example" or "for example" are used to represent giving an example, an illustration, or a description. Any embodiment or design scheme described as an "example" or "for example" in this application should not be explained as being more preferred or having more advantages than another embodiment or design scheme. Exactly, use of the words such as "example" or "for example" is intended to present a related concept in a specific manner.

In description of this application, "indication" may include direct indication and indirect indication, or may include explicit indication and implicit indication. Information indicated by a piece of information (for example, indication information described below) is referred to as to-be-indicated information. In a specific implementation process, there are a plurality of manners of indicating the to-be-indicated information. For example, the to-be-indicated information may be directly indicated by the to-be-indicated information itself, an index of the to-be-indicated information, or the like. For another example, the to-be-indicated information may be indirectly indicated by indicating other information. There is an association relationship between the other information and the to-be-indicated information. For another example, only a part of the to-be-indicated information may be indicated, and the other part of the to-be-indicated information is already known or pre-agreed on. In addition, specific information may be indicated by using a pre-agreed (for example, stipulated in a protocol) arrangement sequence of various pieces of information, to reduce indication overheads to some extent.

The technical solutions of this application are applied to a WLAN, and standards used in the WLAN may be 802.11 standards of the Institute of Electrical and Electronics Engineers (IEEE), for example, an 802.11ad standard, an 802.11ay standard, and a next-generation 802.11 standard.

For ease of understanding, the following first briefly describes some technical terms in embodiments of this application.

1. Personal Basic Service Set Control Point/Access Point Cluster (BSS PCP/AP Cluster, BPAC)

Figure 1:
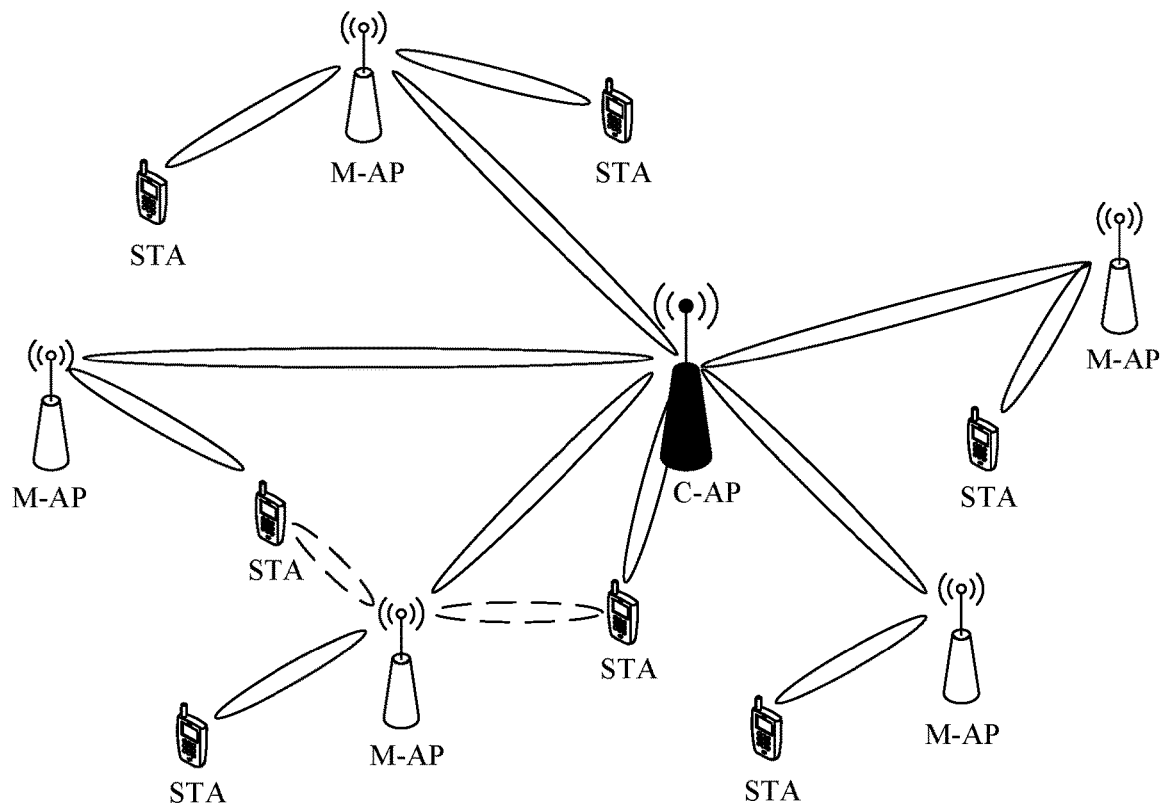
FIG. 1 is a schematic diagram depicting a BPAC architecture according to an embodiment of this application.

BPAC is a high-frequency Wi-Fi coordination framework. As shown in FIG. 1, a BPAC includes a center access point (C-AP), a plurality of member access points (M-AP), and a plurality of STAs.

A function of the C-AP is similar to a synchronization PCP (S-PCP)/synchronization AP (S-AP) in a personal basic service set control point (personal basic service set control point, PCP)/AP cluster (clustering) in 802.11ad/11ay standards. The C-AP is configured to coordinate mutual cooperation between a plurality of M-APs.

An M-AP is configured to serve a STA. The plurality of M-APs may coordinate with each other to serve a same STA.

It may be understood that names of the C-AP and the M-AP are merely examples, and the C-AP and the M-AP may have other names. For example, the C-AP may further be referred to as a first AP, and the M-AP may further be referred to as a second AP.

The C-AP and the M-AP each may be a base station, a PCP, or an AP. The AP may be a wireless router, a wireless transceiver, a wireless switch, or the like.

The STA may have a different name, for example, a subscriber unit, an access terminal, a mobile station, a mobile device, a terminal, user equipment, or the like. In actual application, the STA may be a cellular phone, a smartphone, a wireless local loop (WLL), or another handheld device or computer device that has a wireless local area network communication function.

2. Superframe

A superframe is a logical structure for organizing network communication time allocation. The length of the superframe is fixed. The length of the superframe is a beacon interval (beacon interval, BI).

Figure 2:
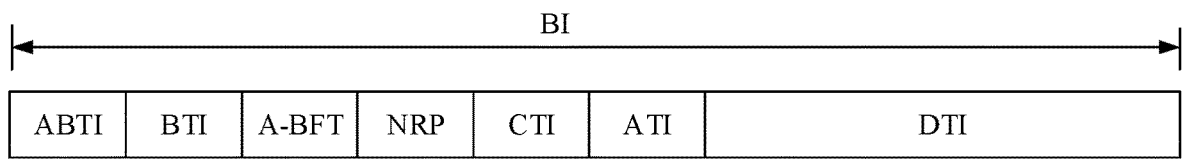
FIG. 2 is a schematic diagram depicting a superframe according to an embodiment of this application.

As shown in FIG. 2, in a BPAC, a superframe includes the following periods: an access point beacon transmission interval (ABTI), a beacon frame transmission interval (BTI), and association beamforming training (A-BFT) period, a neighboring cell report period (NRP), a communication transmission interval (CTI), an ATI, and a data transmission interval (DTI).

At the ABTI, a C-AP sends a directional multi-gigabit (DMG) AP beacon frame to all M-APs. The C-AP sends the DMG AP beacon frame, so that the M-AP learns that a new periodicity starts. In addition, the DMG AP beacon frame carries period information of the new periodicity.

At the BTI, all the M-APs send the DMG Beacon frames in sequence. An M-AP sends a DMG Beacon frame, so that a STA learns that a new periodicity starts, and the DMG Beacon frame carries period information of the new periodicity. In addition, the DMG Beacon may be used for beamforming training between the M-AP and the STA.

In the A-BFT period, the M-AP performs beamforming training on the STA.

In the NRP, the STA feeds back detected interference information to the M-AP.

In the CTI, the M-AP feeds back the received interference information to the C-AP.

The DTI includes several sub-periods. There are the following two types of sub-periods: a contention-based access period (CBAP) and a service period (SP). For example, the DTI may include a CBAP1, a CBAP2, an SP1, an SP2, and the like.

The following specifically describes the technical solutions provided in embodiments of this application with reference to accompanying drawings of the specification of this application.

Figure 3:
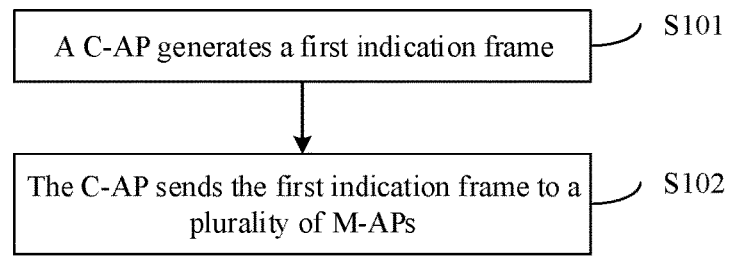
FIG. 3 is a flowchart of a communication method according to an embodiment of this application.

FIG. 3 shows a communication method according to an embodiment of this application. The communication method includes the following operations.

Operation S101: A C-AP generates a first indication frame.

The first indication frame indicates scheduling information in an ATI. In other words, the first indication frame indicates an interaction procedure between the C-AP, an M-AP, and a STA.

It should be noted that the interaction procedure between the C-AP, the M-AP, and the STA includes at least a first interaction phase and a second interaction phase. The first interaction phase is an interaction phase between the M-AP and the STA. The second interaction phase is an interaction phase between the M-AP and the C-AP.

In the interaction phase between the M-AP and the STA, the M-AP receives a first request frame sent by the STA. The first request frame indicates a service demand of the STA. For example, the service demand may be a service buffer of the STA at a MAC layer.

In the interaction phase between the M-AP and the C-AP, the M-AP sends a second request frame to the C-AP, and the C-AP sends a second response frame to the M-AP.

The second request frame indicates one or more service demands of one or more STAs.

The second response frame is for responding to the second request frame. The second response frame indicates, to each M-AP, the one or more STAs to be served by the M-AP. The second response frame may be further denoted as a DMG CAP Grant frame. This is not limited in embodiments of this application.

It should be noted that a DMG AP Beacon frame may be reused as the first indication frame. Alternatively, the first indication frame may be a newly added independent frame. The first indication frame may have another name, for example, a DMG scheduling frame. This is not limited in embodiments of this application.

Operation S102: The C-AP sends the first indication frame to a plurality of M-APs. Each of the plurality of M-APs receives the first indication frame.

In an embodiment, the C-AP sends the first indication frame in an omnidirectional manner. Each of the plurality of M-APs receives the first indication frame in a directional manner.

In another embodiment, the C-AP sends the first indication frame to the plurality of M-APs in a directional manner. Each of the plurality of M-APs receives the first indication frame in a directional/omnidirectional manner.

It should be noted that, when the M-AP receives the first indication frame in a directional manner, the M-AP uses a sector that is obtained through training in a previous period and that is aligned with the C-AP.

It should be noted that, sending of the first indication frame by the C-AP may be specifically implemented as: The C-AP sends the first indication frame in a downlink multi-user multiple-input multiple-output (DL MU-MIMO) manner. Alternatively, the M-AP sends the first indication frame in a polling manner.

In this embodiment of this application, when the first indication frame may be a newly added independent frame, the C-AP sends the first indication frame, to indicate to the plurality of M-APs that the ATI has started.

Based on the technical solution shown in FIG. 3, the C-AP sends the first indication frame to the M-AP, so that the M-AP determines an interaction procedure between the C-AP, the M-AP, and the STA in the ATI, to ensure normal execution in the ATI.

In this embodiment of this application, the first indication frame includes scheduling mode indication information, the scheduling mode indication information indicates a scheduling mode, and the scheduling mode indicates a scheduling status of the interaction phase between the M-AP and the STA and a scheduling status of the interaction phase between the M-AP and the C-AP.

In an embodiment, the scheduling mode includes a first scheduling mode, a second scheduling mode, and a third scheduling mode.

It should be noted that when the scheduling mode indication information uses a first preset value, the scheduling mode indication information indicates the first scheduling mode. When the scheduling mode indication information uses a second preset value, the scheduling mode indication information indicates the second scheduling mode. When the scheduling mode indication information uses a third preset value, the scheduling mode indication information indicates the third scheduling mode.

The first preset value, the second preset value, and the third preset value are specified in a protocol, or are determined by the C-AP and the M-AP through negotiation in advance. This is not limited in embodiments of this application.

For example, Table 1 may show a correspondence between a value and a meaning of the scheduling mode indication information.

TABLE 1

| Value of scheduling mode indication information | Meaning |
|---|---|
| 0 | First scheduling mode |
| 1 | Second scheduling mode |
| 2 | Third scheduling mode |

Figure 4:
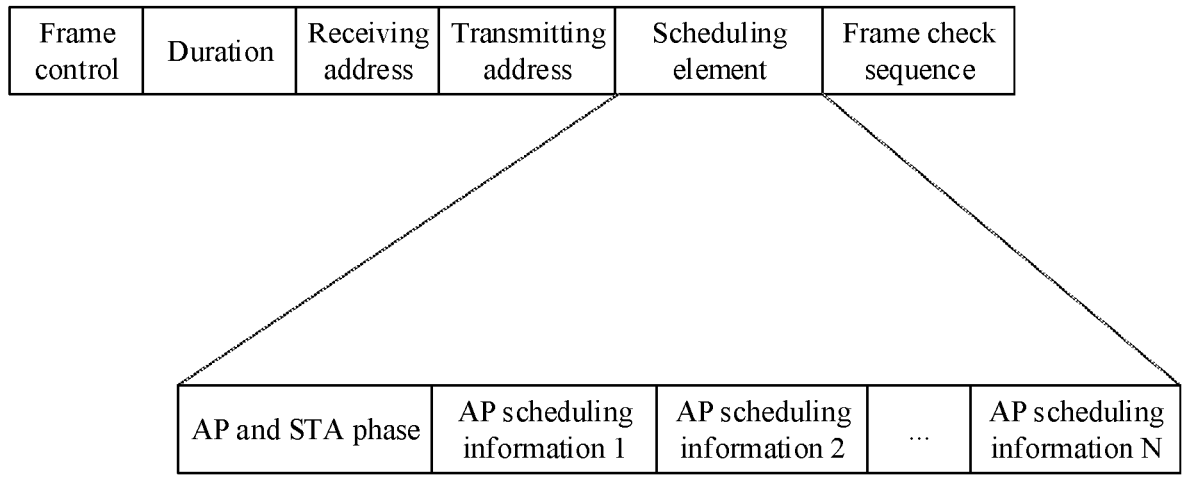
FIG. 4 is a schematic diagram depicting a frame structure of a first indication frame according to an embodiment of this application.

For example, FIG. 4 shows a schematic diagram depicting a frame structure of the first indication frame. The first indication frame includes at least a frame control field, a duration field, a receiving address (RA), a transmitting address (TA), a scheduling element field, and a frame check sequence (FCS).

The scheduling element field further includes an AP and STA phase subfield and one or more pieces of AP scheduling information. For example, the scheduling element field includes AP scheduling information 1 to AP scheduling information N.

It should be noted that the AP and STA phase subfield is for carrying the scheduling mode indication information.

It should be noted that the AP scheduling information one-to-one corresponds to the M-APs. The AP scheduling information indicates a scheduling parameter related to a corresponding M-AP. In different scheduling modes, the AP scheduling information may include different scheduling parameters.

Figure 5:
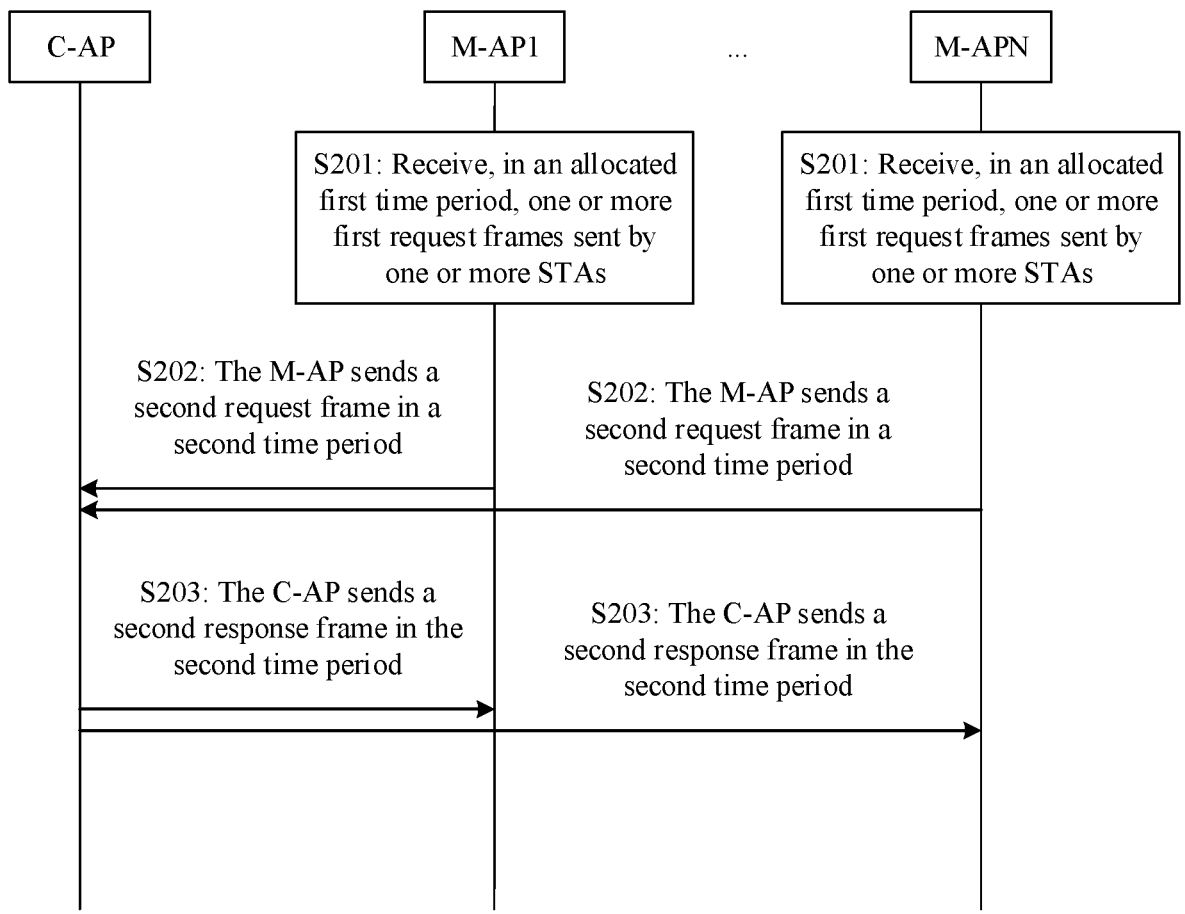
FIG. 5 is a schematic diagram depicting a procedure in an ATI based on a first scheduling mode according to an embodiment of this application.

The following describes each scheduling mode with reference to a specific embodiment.
(1) First Scheduling Mode As shown in FIG. 5, based on the first scheduling mode, the following operations are included in an ATI.

Operation S201: An M-AP obtains one or more first request frames from one or more STAs in an allocated first time period.

In this application, the first time period corresponding to the M-AP is allocated by a C-AP. For example, the C-AP allocates a first time period to each M-AP by using the first indication frame.

In an embodiment, that the first indication frame is used to allocate a first time period to each M-AP includes at least one of the following designs.

Design 1: The first indication frame is used to indicate a quantity of first time periods in the ATI, duration of each first time period, and an index of a first time period corresponding to each M-AP.

Based on the foregoing design 1, start time of a first time period whose index is 1 is start time of the ATI or time of receiving the first indication frame. Start time of a first time period whose index is n is end time of a first time period whose index is n−1, where n is a positive integer greater than 1.

Therefore, the M-AP determines locations of each first time period in time domain based on the quantity of first time periods in the ATI and duration of each first time period that are indicated by the first indication frame. Further, the M-AP determines, based on an index of the first time period corresponding to the M-AP, a location of the first time period corresponding to the M-AP in time domain.

Based on the foregoing design 1, indexes of first time periods corresponding to different M-APs may be the same or may be different. This is not limited in embodiments of this application.

Design 2: The first indication frame includes allocation information of each M-AP, where the allocation information includes a basic service set identifier (basic service set identifier, BSSID)/an AID, duration of a first time period, and start time of the first time period.

Based on design 2, the M-AP determines, from the first indication frame based on a BSSID/AID of the M-AP, allocation information corresponding to the M-AP. Further, the M-AP determines, based on the duration and start time of the first time period indicated by the allocation information corresponding to the M-AP, the location of the first time period corresponding to the M-AP in time domain.

Design 3: The first indication frame includes allocation information of each M-AP, where the allocation information includes duration of a first time period. In the first indication frame, the allocation information of a plurality of M-APs is arranged in a preset order. The preset order is an order in which the plurality of M-APs are arranged in ascending order of BSSIDs/AIDs. Alternatively, the preset order is an order in which the plurality of M-APs are arranged in descending order of BSSIDs/AIDs.

In addition, an arrangement sequence number of the allocation information of an M-AP in the preset order is used to determine an index of a first time period allocated to the M-AP in time domain.

Based on design 3, although there is no BSSID/AID in the allocation information of the M-AP included in the first indication frame, the M-AP may determine, based on a sequence number of a BSSID/an AID of the M-AP in the preset order, the allocation information corresponding to the M-AP, and further determine a location of the first time period corresponding to the M-AP in time domain.

Design 4: The first indication frame includes allocation information of each M-AP, where the allocation information includes a BSSID/an AID and duration of a first time period. In the first indication frame, the allocation information of the plurality of M-APs is arranged in a preset order. The preset order is an order in which the plurality of M-APs are arranged in ascending order of BSSIDs/AIDs. Alternatively, the preset order is an order in which the plurality of M-APs are arranged in descending order of BSSIDs/AIDs.

In addition, an arrangement sequence number of allocation information of an M-AP in the preset order is used to determine an index of a first time period allocated to the M-AP in time domain.

Based on design 4, the M-AP determines, based on a BSSID/an AID of the M-AP, the allocation information corresponding to the M-AP in the first indication frame; and further determine, based on the allocation information corresponding to the M-AP, a location of the first time period corresponding to the M-AP in time domain.

Design 5: The first indication frame indicates first duration. It should be noted that duration of all first time periods is the first duration. In addition, the first time periods allocated to the M-APs are arranged in a preset order in time domain. The preset order is an order in which the plurality of M-APs are arranged in ascending order of BSSIDs/AIDs. Alternatively, the preset order is an order in which the plurality of M-APs are arranged in descending order of BSSIDs/AIDs.

Based on design 5, the M-AP determines, based on an arrangement sequence number of a BSSID/an AID of the M-AP in the preset order, an index of a first time period corresponding to the M-AP in time domain, and further determines, based on the duration of the first time period, a location of the first time period corresponding to the M-AP in time domain.

Design 6: The first indication frame indicates first duration and an M-AP arrangement sequence.

Based on design 6, an M-AP determines, based on a sequence number of the M-AP in the M-AP arrangement sequence, an index of a first time period corresponding to the M-AP in time domain, and further determines, based on the duration of the first time period, a location of the first time period corresponding to the M-AP in time domain.

It may be understood that the foregoing design 1 to design 6 are merely examples, and embodiments of this application are not limited thereto.

In implementation 1 of operation S201, the M-AP obtains the first request frame from the STA in a polling manner in the allocated first time period. That is, in the allocated first time period, the M-AP sends a first polling frame to a target STA, where the first polling frame is for triggering the target STA to send the first request frame; then, the M-AP receives the first request frame sent by the target STA. The target STA is any one of the plurality of STAs served by the M-AP.

Figure 6:
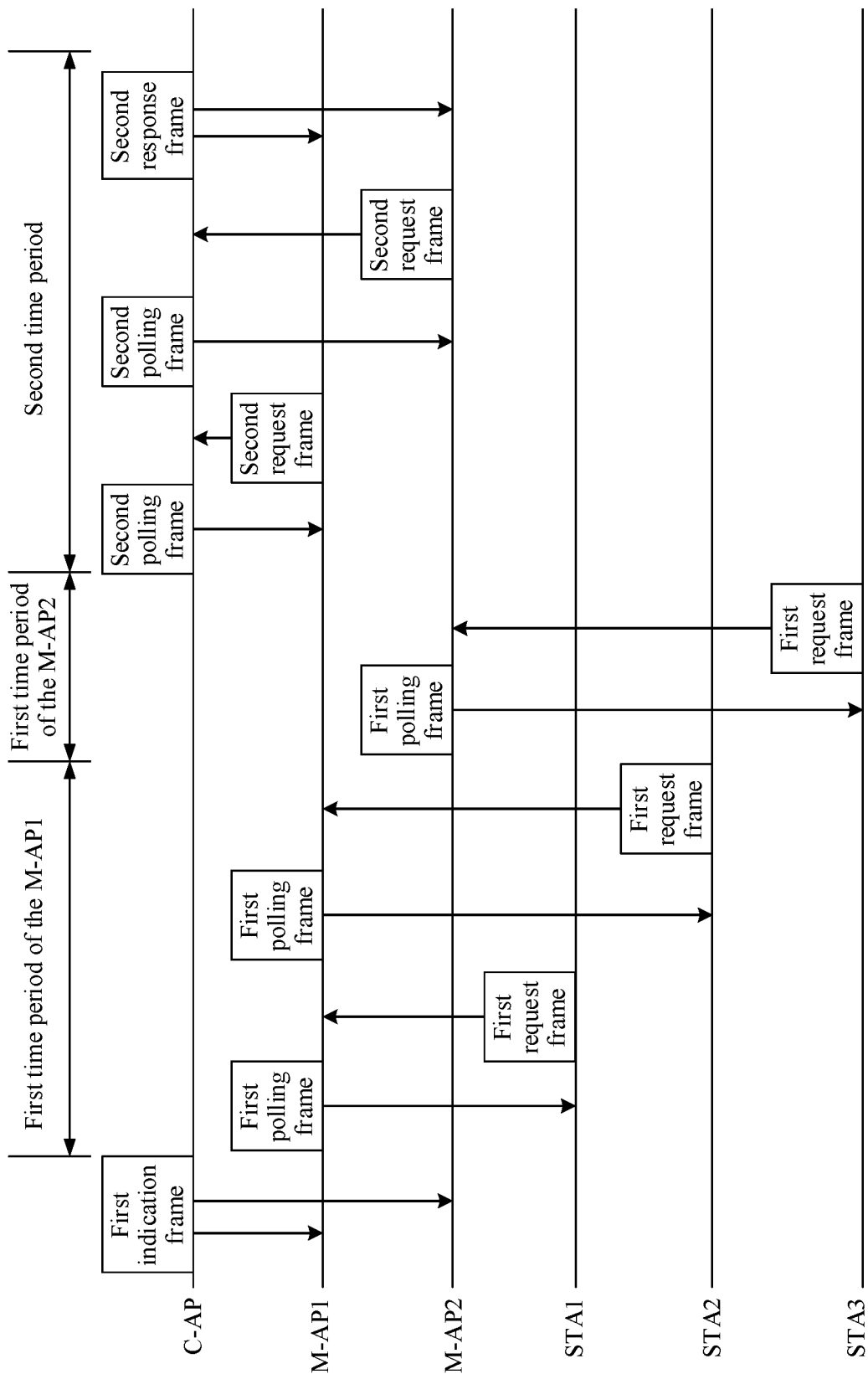
FIG. 6 is diagram 1 depicting a time sequence in an ATI based on a first scheduling mode according to an embodiment of this application.

An example is used for description of implementation 1 of operation S201 with reference to FIG. 6. The C-AP first sends the first indication frame to an M-AP1 and an M-AP2, and the scheduling mode indication information included in the first indication frame takes the first preset value. Therefore, in a first time period corresponding to the M-AP1, the M-AP1 sends a first polling frame to each of a STA1 and a STA2, so that the M-AP1 receives a first request frame sent by each of the STA1 and the STA2. In a first time period corresponding to the M-AP2, the M-AP2 sends a first polling frame to a STA3, so that the M-AP2 receives a first request frame sent by the STA3.

It should be noted that, when the M-AP requests, in a polling manner, the STA to report the first request frame, the first request frame reported by the STA is a new service period request (New SPR) frame. The new SPR frame uses a format of an SPR frame in an existing protocol.

In an embodiment, the first request frame may carry a buffer state report (BSR) and an AP coordination request. The BSR indicates an amount of data to be sent in an uplink buffer. The AP coordination request is for requesting the plurality of M-APs to coordinate with each other to serve the STA.

As shown in FIG. 7, the SPR frame in the existing protocol includes a frame control field, a duration field, a receiving address, a transmitting address, dynamic allocation information (dynamic allocation info), a beamforming control field, and a frame check sequence. The dynamic allocation information is for carrying related information about a service demand to be reported by the STA.

It should be noted that the first polling frame may use a frame format of a polling frame in a conventional technology. As shown in FIG. 8, the polling frame in the existing protocol includes a frame control field, a duration field, a receiving address, a transmitting address, a response offset, and a frame check sequence.

In implementation 2 of operation S201, the M-AP obtains the first request frame from the STA in non-polling manner in the allocated first time period. That is, in an allocated first time period, the M-AP sends a second indication frame, where the second indication frame indicates one or more STAs served by the M-AP to send one or more first request frames; then, the M-AP receives the one or more first request frames sent by the one or more STAs.

It may be understood that when the M-AP serves a plurality of STAs, the plurality of STAs contend for, after receiving the second indication frame, a channel to send the first request frames.

Figure 9:
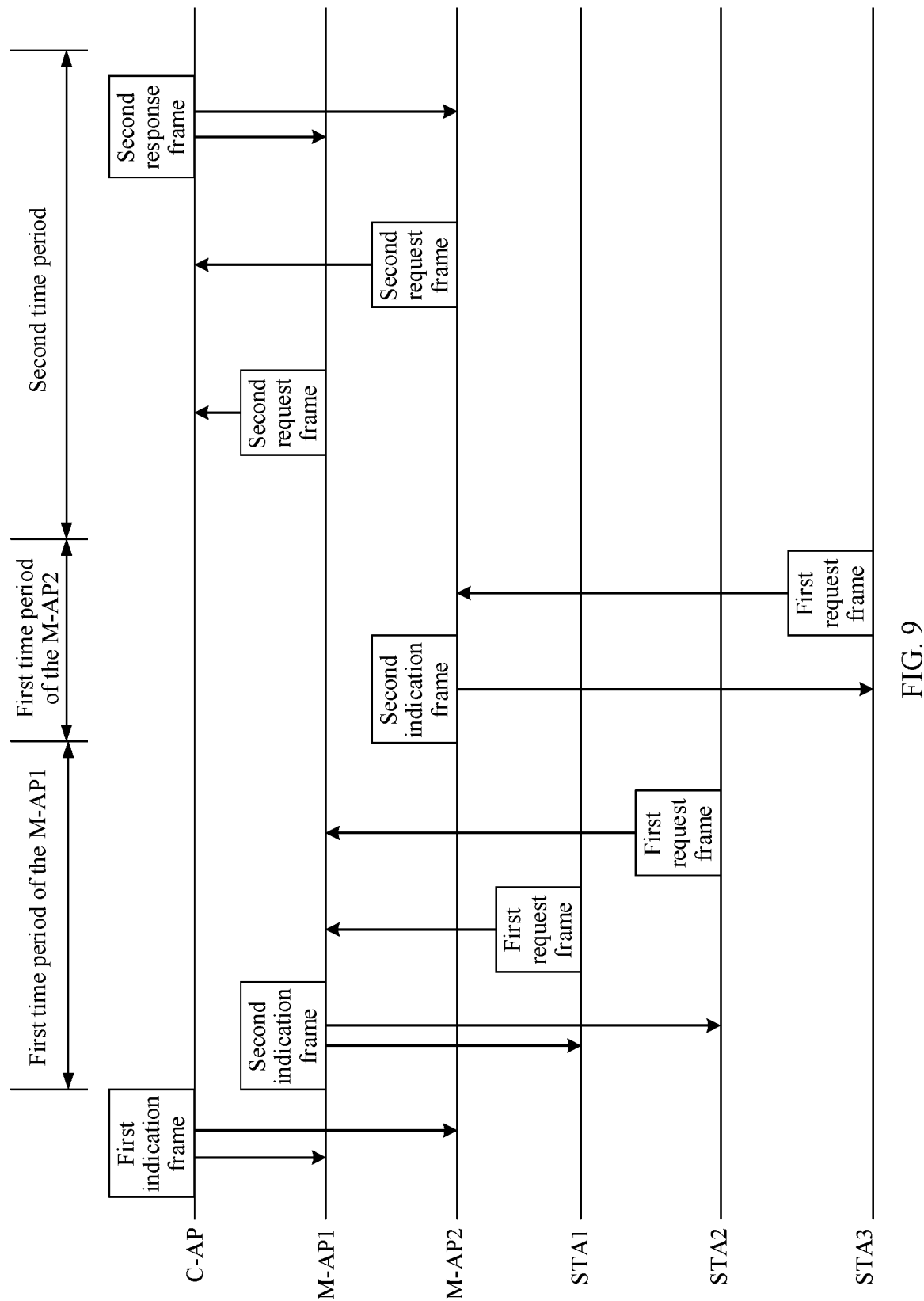
FIG. 9 is diagram 2 depicting a time sequence in an ATI based on a first scheduling mode according to an embodiment of this application.

An example is used for description of implementation 2 of operation S201 with reference to FIG. 9. In a first time period corresponding to an M-AP1, the M-AP1 first sends a second indication frame; after receiving the second indication frame, the STA1 and the STA2 contend for a channel to send the first request frames to the M-AP1 when a channel is obtained through contention. In a first time period corresponding to an M-AP2, the M-AP2 first sends a second indication frame, and the STA3 sends the first request frame to the M-AP2 after receiving the second indication frame.

It should be noted that, when the M-AP requests, in a non-polling manner, the STA to report the first request frame, the first request frame reported by the STA is a DMG add traffic stream (ADDTS) request frame. For a frame structure of the DMG ADDTS request frame, refer to a conventional technology. Details are not described herein again.

It should be noted that the second indication frame is an action frame. The second indication frame may have another name, for example, a DMG phase start frame. This is not limited in embodiments of this application.

For example, as shown in FIG. 10, the second indication frame includes a frame control field, a duration field, a receiving address, a transmitting address, a DMG phase start element field, and a frame check sequence. The DMG phase start element field includes duration of the first time period.

It may be understood that, based on the second indication frame shown in FIG. 10, the STA may learn of duration of a first time period corresponding to the M-AP, ensuring that the STA reports in a timely manner the first request frame to the M-AP in the first time period corresponding to the M-AP.

Operation S202: The M-AP sends a second request frame in a second time period.

Correspondingly, the C-AP receives, in the second time period, second request frames sent by the plurality of M-APs.

The second time period is different from the first time period. In time domain, the second time period is after all the first time periods. The second time period is determined by the C-AP, or is defined in a standard.

In an embodiment, the second request frame may use a format of an SPR frame in the existing protocol. In this way, dynamic allocation information in the second request frame is for carrying related information in the one or more first request frames received by the M-AP, for example, a service demand of the STA.

In implementation 1 of operation S202, the C-AP obtains, in a polling manner in the second time period, the second request frame sent by the M-AP. That is, in the second time period, the C-AP sends a second polling frame to a target M-AP, where the second polling frame is for triggering the target M-AP to send a second request frame; then, the C-AP receives the second request frame sent by the target M-AP. The target M-AP is any one of the plurality of M-APs.

An example is used for description of implementation 1 of operation S202 with reference to FIG. 6. In the second time period, the C-AP first sends a second polling frame to the M-AP1, to trigger an M-AP1 to report a second request frame; then, the C-AP sends a second polling frame to an M-AP2, to trigger the M-AP2 to report a second request frame.

The second polling frame may use a frame structure of a polling frame in a conventional technology. For the frame structure of the polling frame in the conventional technology, refer to FIG. 8.

It should be noted that, in a polling process, after the C-AP sends the second polling frame to the first M-AP, the C-AP sends the second polling frame to the second M-AP if the C-AP receives, in a preset time interval, no second request frame sent by the first M-AP. The first M-AP and the second M-AP are two different M-APs.

In an embodiment, the preset time interval may be a time interval between frames (xIFS). xIFS represents a time interval between frame that is not explicitly specified.

For example, it is assumed that the C-AP first sends the second polling frame to the M-AP1. Then, the C-AP receives, in the xIFS, no second request frame sent by the M-AP1. In this case, to ensure normal execution in the ATI, the C-AP sends a second polling frame to the M-AP2, instead of keeping waiting for the M-AP1 to report the second request frame.

In implementation 2 of operation S202 the C-AP obtains, in a non-polling manner in the second time period, the second request frame sent by the M-AP. That is, in the second time period, the plurality of M-APs directly send the second request frames to the C-AP in the second time period, so that the C-AP receives the second request frames from the plurality of M-APs.

An example is used for description of implementation 2 of operation S202 with reference to FIG. 9. In the second time period, the M-AP1 is the first one to obtain the channel through contention. Therefore, the M-AP1 is the first one to send the second request frame to the C-AP. Then, the M-AP2 sends the second request frame to the C-AP.

Operation S203: The C-AP sends a second response frame in the second time period.

In an embodiment, in the second time period, the C-AP makes a corresponding decision based on all received second request frames. Accordingly, the C-AP sends the second response frame to the plurality of M-APs in the second time period, so that each M-AP learns of a STA to be served by the M-AP. This ensures normal AP coordination.

Based on the first scheduling mode, the M-AP and the STA implement the first interaction phase in the first time period, and the M-AP and the C-AP implement the second interaction phase in the second time period. Because the first time period and the second time period are two different time periods, based on the first scheduling mode, the first interaction phase is completely isolated from the second interaction phase in terms of time.

It may be understood that, based on the first scheduling mode, as the C-AP makes the decision after all the M-APs exchange information with the STAs, the C-AP can implement more comprehensive scheduling.

For example, as shown in FIG. 11, based on the first scheduling mode, AP scheduling information in the first indication frame may include an AID, first indication information, start time of the first time period, duration of the first time period, second indication information, start time of the second time period, and duration of the second time period.

It may be understood that the M-AP reads only AP scheduling information with the same AID as the M-AP based on the AID of the M-AP, and executes the procedure in the ATI based on the AP scheduling information.

The start time of the first time period and the duration of the first time period are for determining the first time period of the M-AP corresponding to the AID.

The first indication information indicates whether the M-AP communicates with the STA in a polling manner. In other words, the first indication information indicates whether the M-AP obtains the first request frame from the STA in a polling manner. The first indication information may be further denoted as an AP poll subfield. This is not limited in embodiments of this application.

It should be noted that the first indication information may be implemented with one or more bits. For example, when the first indication information is implemented with one bit, the first indication information "0" indicates that the M-AP obtains the first request frame from the STA in a polling manner, and the first indication information "1" indicates that the M-AP obtains the first request frame from the STA in a non-polling manner.

The second indication information indicates whether the M-AP communicates with the C-AP in a polling manner. In other words, the second indication information indicates whether the C-AP obtains the second request frame from the M-AP in a polling manner. The second indication information may be further denoted as a C-AP poll subfield. This is not limited in embodiments of this application.

It should be noted that the second indication information may be implemented with one or more bits. For example, when the second indication information is implemented with one bit, the second indication information "0" indicates that the C-AP obtains the second request frame from the M-AP in a polling manner, and the second indication information "1" indicates that the C-AP obtains the first request frame from the STA in a non-polling manner.

In this embodiment of this application, if the second indication information indicates that the C-AP obtains the second request frame from the M-AP in a polling manner, the duration of the second time period and the start time of the second time period in the AP scheduling information may be set to 0. That is, the C-AP does not need to notify the M-AP of the location of the second time period in time domain.

(2) Second Scheduling Mode

As shown in FIG. 12, based on the second scheduling mode, an ATI includes the following operations.

Operation S301: An M-AP receives, in an allocated first time period, a first request frame sent by a STA.

Operation S301 is similar to operation S201. For specific description of operation S301, refer to the foregoing description. Details are not described herein again.

Operation S302: The M-AP sends a second request frame to a C-AP in the allocated first time period.

In an embodiment, the M-AP sends the second request frame to the C-AP after the M-AP receives the first request frame in the allocated first time period.

Figure 13:
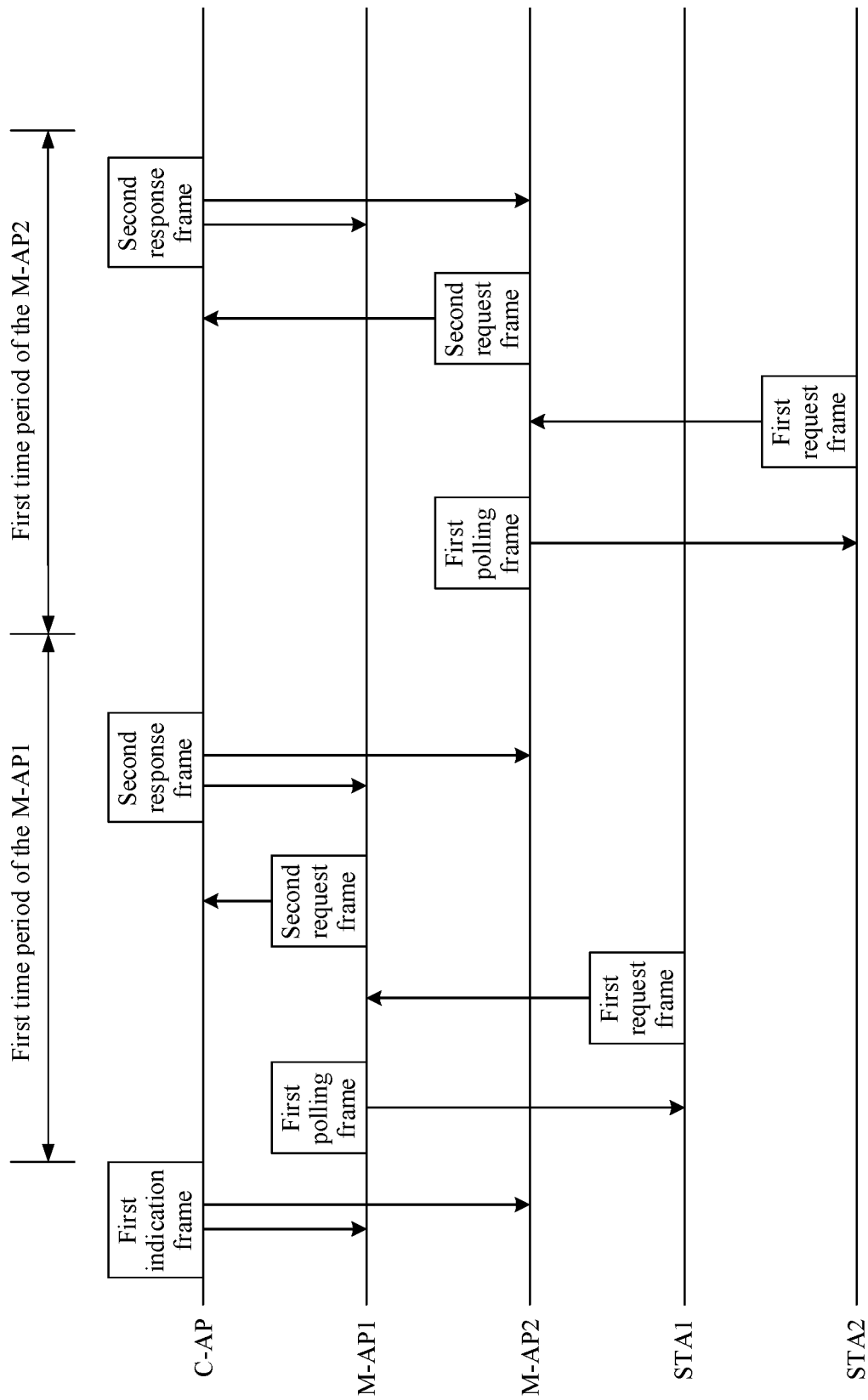
FIG. 13 is a diagram depicting a time sequence in an ATI based on a second scheduling mode according to an embodiment of this application.

An example is used for description with reference to FIG. 13. In a first time period corresponding to an M-AP1, the M-AP1 sends a first polling frame to a STA1, to trigger the STA1 to report the first request frame; the M-AP1 sends the second request frame to the C-AP after receiving the first request frame reported by the STA1.

Operation S303: The C-AP sends a second response frame in the first time period allocated to the M-AP. Correspondingly, the M-AP receives, in the allocated first time period, the second response frame sent by the C-AP.

An example is used for description with reference to FIG. 13. In the first time period corresponding to the M-AP1, the M-AP1 sends the second request frame to the C-AP immediately after receiving the first request frame sent by STA1. The C-AP sends the second response frame to the M-AP1 and an M-AP2 based on the second request frame sent by the M-AP1.

Based on the second scheduling mode, for an M-AP, an interaction phase between the M-AP and the STA and an interaction phase between the M-AP and the C-AP completely overlap in time domain, and both of the interaction phases occupy a first time period corresponding to the M-AP.

Based on the second scheduling mode, the M-AP sends a second request frame to the C-AP in a timely manner after receiving the first request frame. Accordingly, the C-AP may learn a service demand of the STA in a timely manner, and the C-AP makes a decision in real time and delivers a second response frame carrying decision information to the M-AP. In this way, the service demand of the STA can be met in a timely manner.

Figures 14, 15:
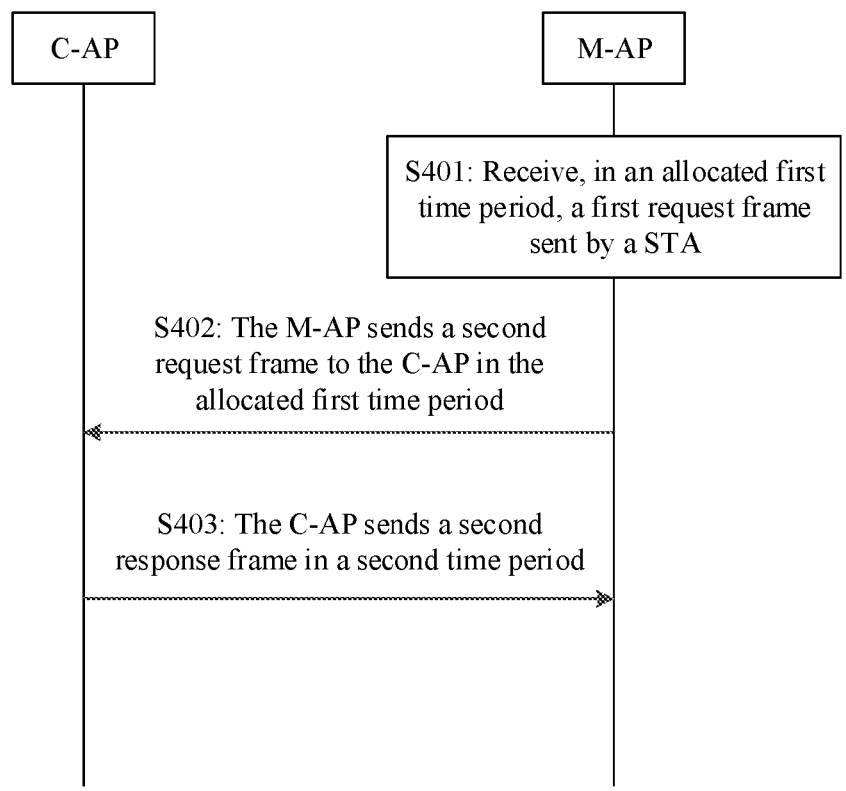
FIG. 14 is schematic diagram 2 depicting a structure of AP scheduling information in a first indication frame according to an embodiment of this application.
FIG. 15 is a flowchart depicting a procedure in an ATI based on a third scheduling mode according to an embodiment of this application.

For example, as shown in FIG. 14, based on the second scheduling mode, AP scheduling information in a first indication frame may include an AID, first indication information, duration of the first time period, and start time of the first time period. For specific description of the first indication information, refer to the foregoing description. Details are not described herein again.

(3) Third Scheduling Mode

As shown in FIG. 15, based on the third scheduling mode, an ATI includes the following operations.

Operation S401: An M-AP receives, in an allocated first time period, a first request frame sent by a STA.

Operation S402: The M-AP sends a second request frame to a C-AP in the allocated first time period.

Operations S401 and S402 are similar to operations S301 and S302. For specific description of operations S401 and S402, refer to the foregoing description. Details are not described herein again.

In an embodiment, in the first time period, when the C-AP receives the second request frame sent by the M-AP, the C-AP may send an acknowledgment frame to the M-AP, so that the M-AP learns that the C-AP has received the second request frame.

In an embodiment, a time interval between sending the acknowledgment frame by the C-AP and receiving the second request frame by the C-AP may be less than or equal to a short inter-frame space (short inter-frame space, SIFS).

Operation S403: The C-AP sends the second response frame in a second time period.

Operation S403 is similar to operation S203. For specific description of operation S403, refer to the foregoing description. Details are not described herein again.

Figure 16:
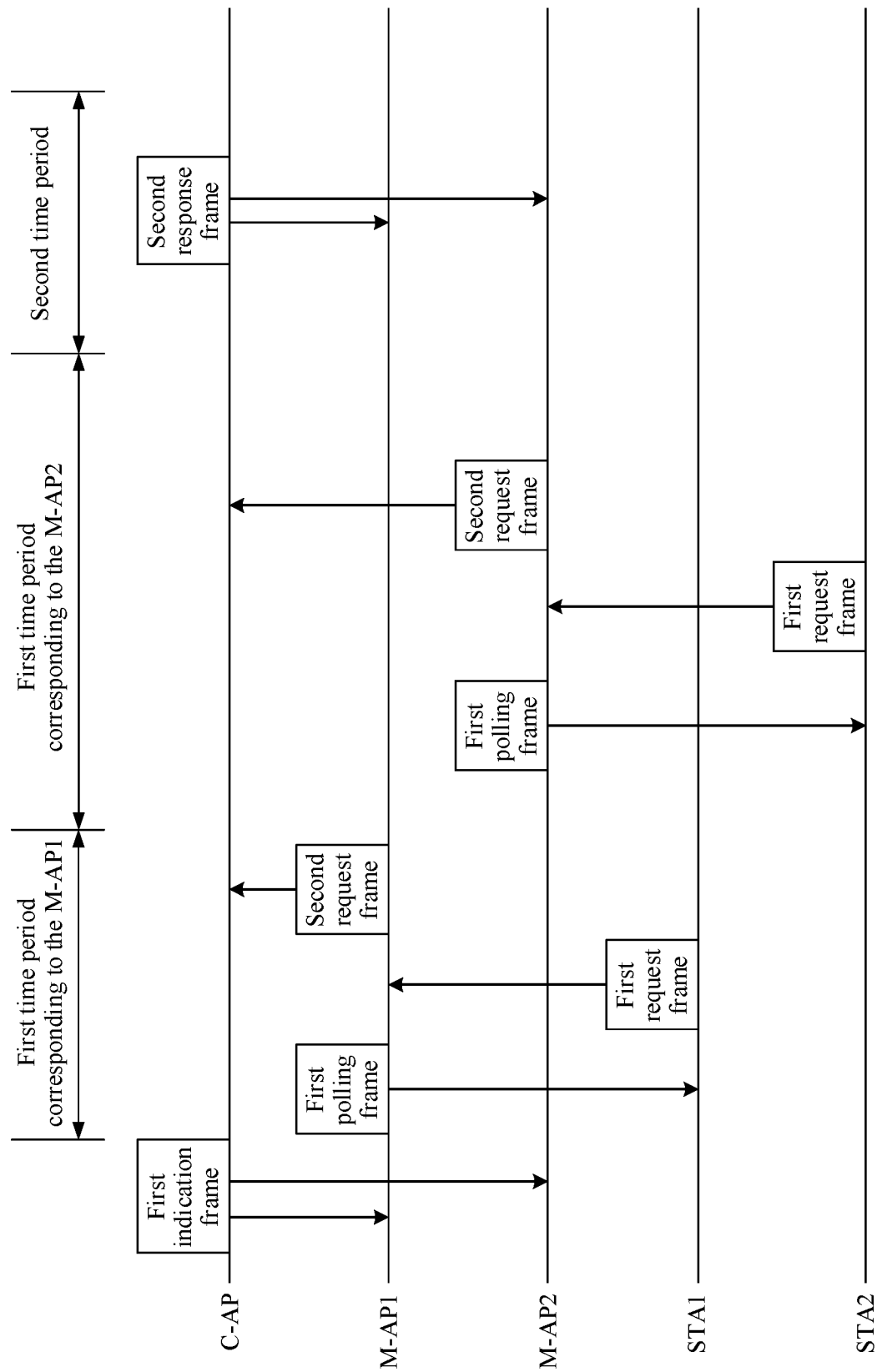
FIG. 16 is a diagram depicting a time sequence in an ATI based on a third scheduling mode according to an embodiment of this application.

An example is used for description of the third scheduling mode with reference to FIG. 16. In a first time period corresponding to an M-AP1, the M-AP1 sends a first polling frame to a STA1, to trigger the STA1 to report the first request frame; the M-AP1 sends a second request frame to the C-AP after receiving the first request frame. In a first time period corresponding to an M-AP2, the M-AP2 sends a first polling frame to a STA2, to trigger the STA2 to report a first request frame; the M-AP2 sends a second request frame to the C-AP after receiving the first request frame. In the second time period, the C-AP sends the second response frame to the M-AP1 and M-AP2.

Based on the third scheduling mode, an interaction phase between the M-AP and the STA and an interaction phase between the M-AP and the C-AP completely overlap in time domain.

It may be understood that, based on the third scheduling mode, the M-AP, the C-AP, and the STA interact and associate, making a procedure in the ATI logically clear. In addition, the C-AP makes a decision after all the M-APs report the second request frame, and delivers the second response frame. Accordingly, a decision made by the C-AP is comprehensive, which helps take the service demand of each STA into account.

For example, as shown in FIG. 14, based on the third scheduling mode, AP scheduling information in the first indication frame may include an AID, first indication information, duration of the first time period, and start time of the first time period. For specific description of the first indication information, refer to the foregoing description. Details are not described herein again.

It should be noted that the first time period may be divided into a plurality of third time periods, and each third time period corresponds to one STA. Accordingly, the M-AP receives, in the third time period, the first request frame reported by the corresponding STA.

Figure 17:
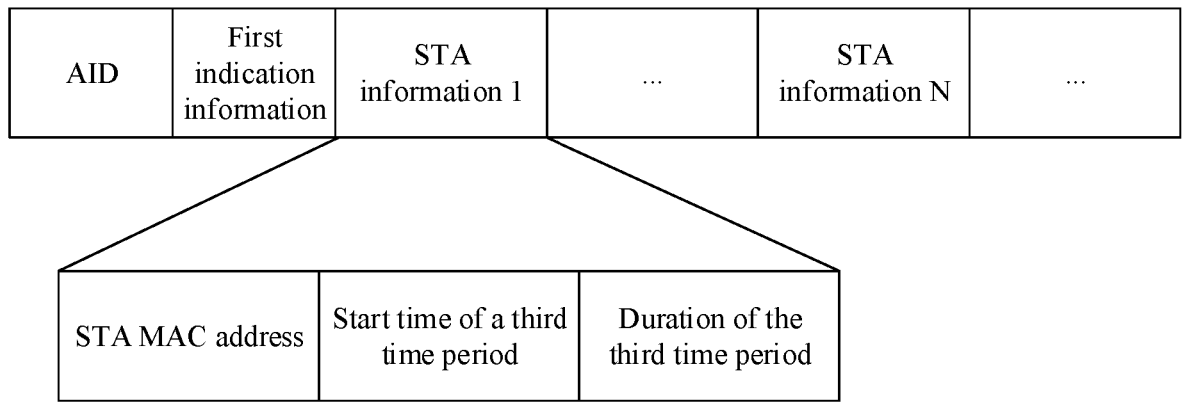
FIG. 17 is schematic diagram 3 depicting a structure of AP scheduling information in a first indication frame according to an embodiment of this application.
Figure 17:
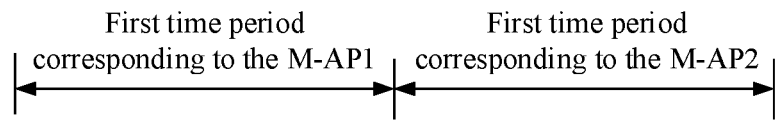

For example, as shown in FIG. 17, AP scheduling information in the first indication frame may include an AID, first indication information, and one or more pieces of STA information. The STA information includes a MAC address of the STA, start time of the third time period, and duration of the third time period. The third time period is a time period used by the M-AP for STA polling.

The following describes various cases in which first time periods correspond to a plurality of M-APs.

Case 1: The first time periods corresponding to the plurality of M-APs are isolated in time domain. That is, the first time periods corresponding to the plurality of M-APs are at different locations in time domain.

Figure 18:
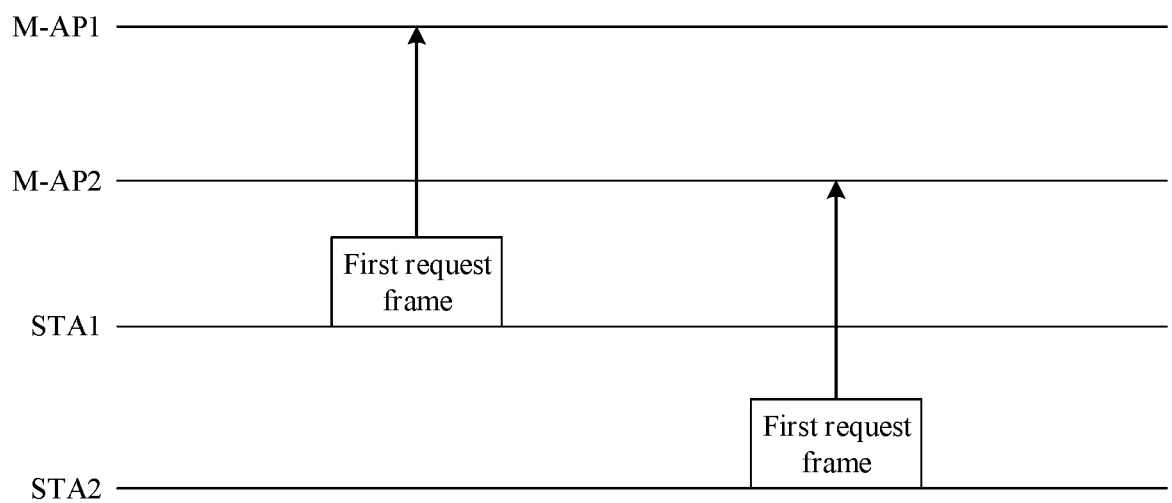
FIG. 18 is schematic diagram 1 depicting a first time period according to an embodiment of this application.

An example is used for description with reference to FIG. 18. A first time period corresponding to an M-AP1 and a first time period corresponding to an M-AP2 do not overlap.

It may be understood that the first time periods corresponding to the plurality of M-APs are isolated in time domain. This helps avoid communication interference between the plurality of M-APs.

Case 2: The first time periods corresponding to the plurality of M-APs completely overlap in time domain.

Figure 19:
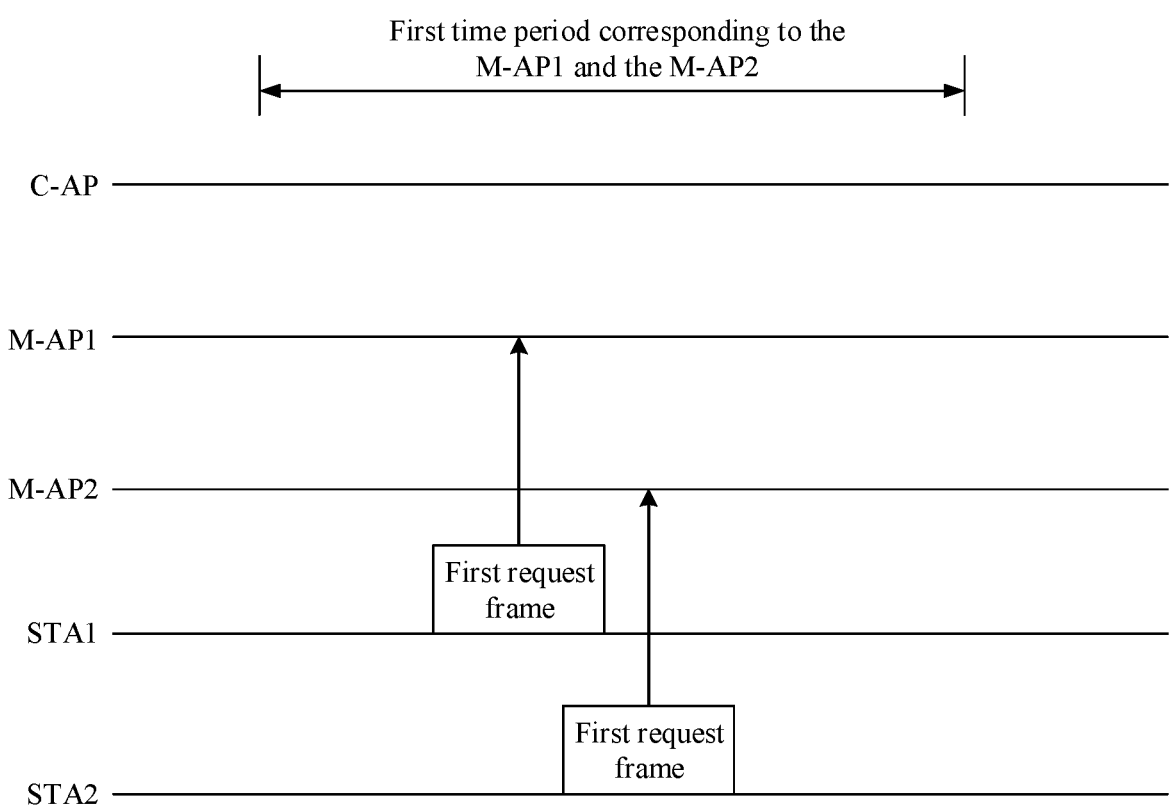
FIG. 19 is schematic diagram 2 depicting a first time period according to an embodiment of this application.

An example is used for description with reference to FIG. 19. An M-AP1 and an M-AP2 both correspond to a same first time period.

It may be understood that the first time periods corresponding to the plurality of M-APs completely overlap in time domain. This helps save air interface resources.

Case 3: The first time periods corresponding to a part of the plurality of M-APs overlap in time domain.

Figure 20:
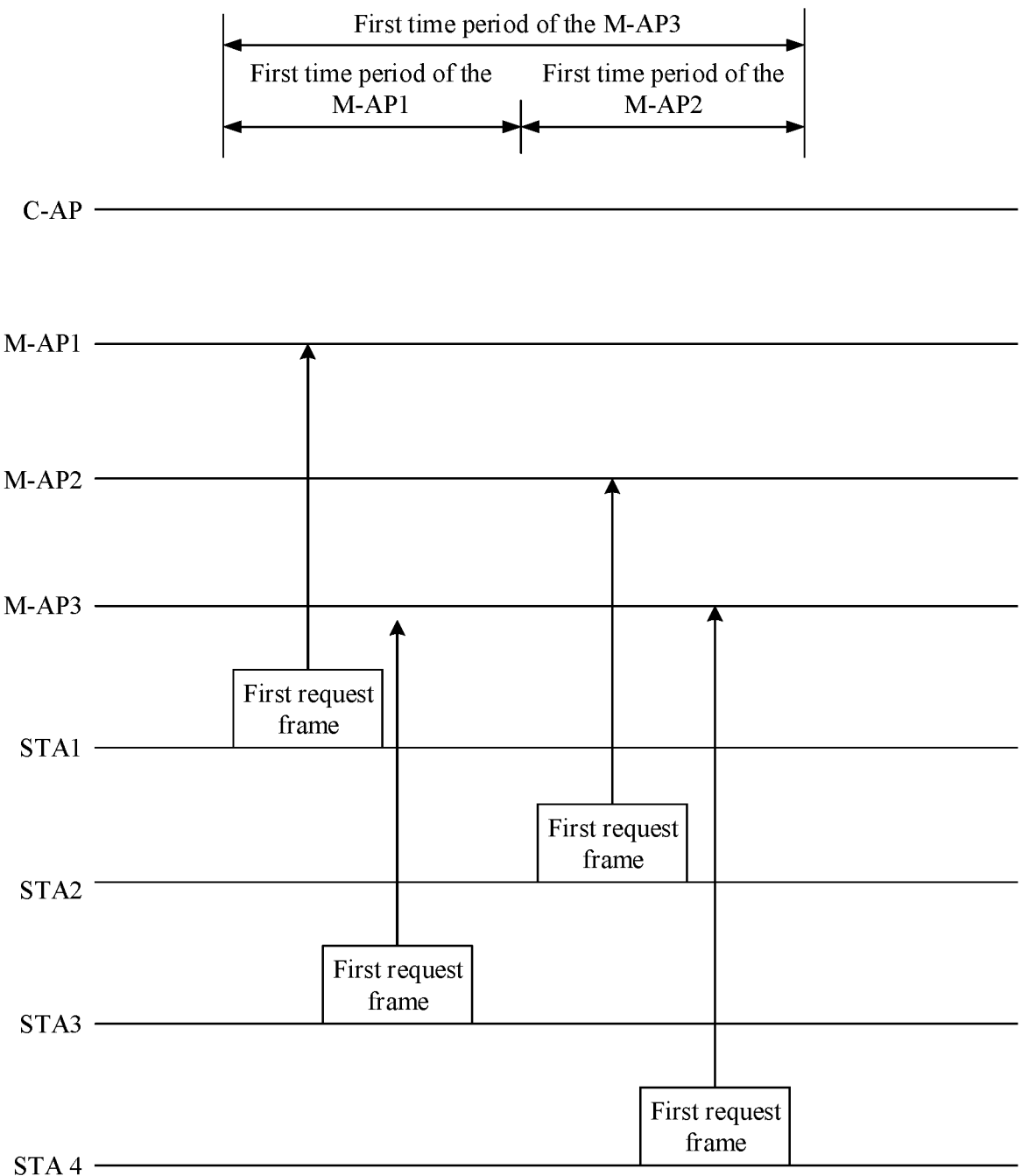
FIG. 20 is schematic diagram 3 depicting a second time period according to an embodiment of this application.

An example is used for description with reference to FIG. 20. A first time period corresponding to an M-AP1 and a first time period corresponding to an M-AP3 partially overlap in time domain, and a first time period corresponding to an M-AP2 and the first time period corresponding to the M-AP3 partially overlap in time domain.

It may be understood that, from an overall perspective, the C-AP may determine some M-APs that do not interfere with each other or interfere with each other slightly, so that communication of the M-APs is not affected when the C-AP allocates a same first time period to the M-APs. In addition, this helps save air interface resources.

The second response frame is specifically described below with reference to FIG. 21.

Figure 21:
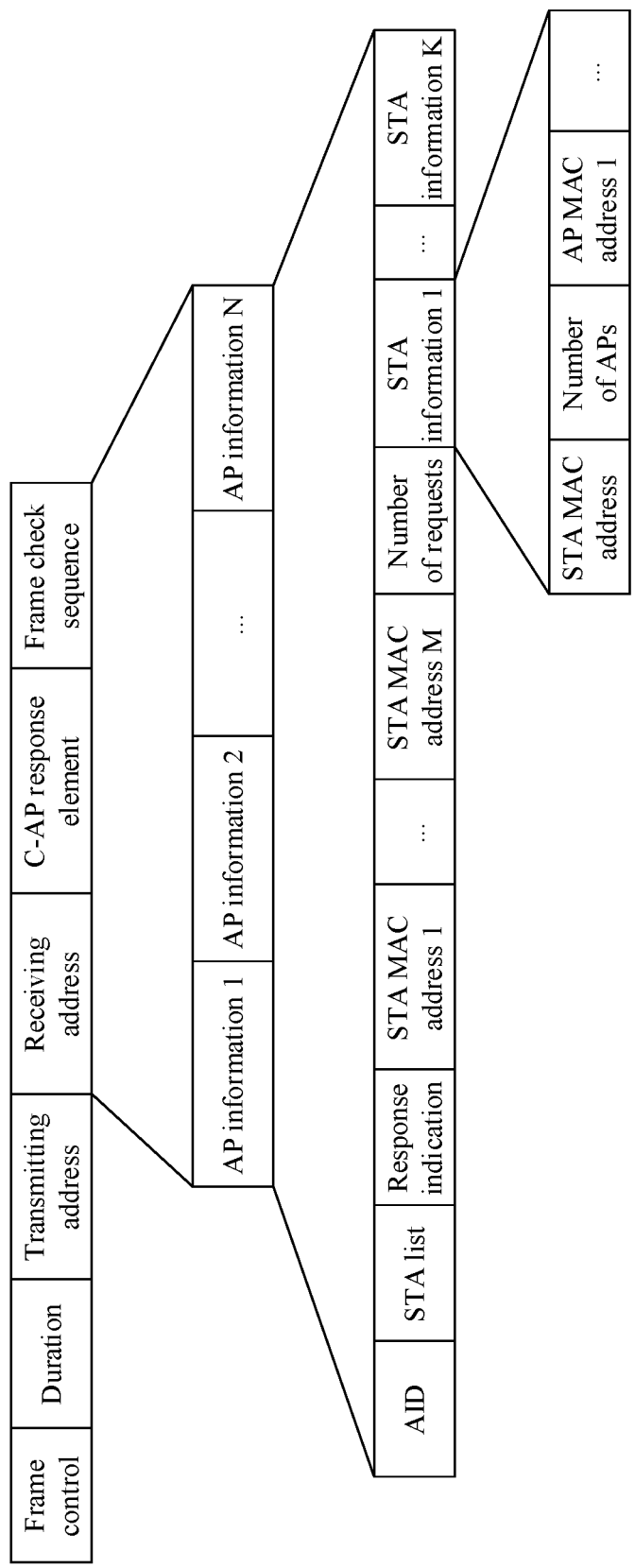
FIG. 21 is a schematic diagram depicting a frame structure of a second response frame according to an embodiment of this application.

As shown in FIG. 21, the second response frame includes a frame control field, a duration field, a transmitting address, a receiving address, a C-AP response element field, and a frame check sequence.

The C-AP response element field includes one or more pieces of AP information.

In this embodiment of this application, the AP information includes an AID, a STA list, a response indication, M STA MAC addresses, a number of requests, and K pieces of STA information. M is an integer greater than or equal to 0, and K is a positive integer.

The STA list may be implemented with one bit. The STA list indicates whether the M-AP needs to serve a new STA.

The response indication may be implemented with one bit. The response indication indicates whether the M-AP feeds back a first response frame to the STA. For example, when the response indication indicates that the M-AP needs to feed back the first response frame to the STA, the M-AP needs to continue parsing a subsequent field of the second response frame, to obtain a corresponding STA MAC address. When the response indication indicates that the M-AP does not need to feed back the first response frame to the STA, the M-AP does not need to continue parsing the second response frame.

When the STA list indicates that the M-AP needs to serve a new STA, M STA MAC addresses are M new STA MAC addresses.

The number of requests may be implemented with 48 bits. The number of requests indicates a quantity of STAs that send the first request frame.

The STA information is information about a STA to be served by the M-AP. The STA information includes a STA MAC address, a number of APs, and one or more AP MAC addresses. The number of APs indicates a quantity of APs that serve the STA corresponding to the STA information. The one or more AP MAC addresses are one MAC address or MAC addresses of one or more APs that serve the STA corresponding to the STA information.

Figure 22:
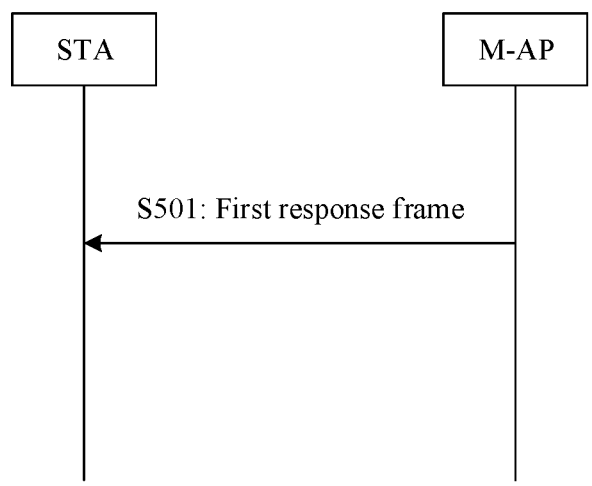
FIG. 22 is a flowchart of another communication method according to an embodiment of this application.

In an embodiment, FIG. 22 shows a communication method according to an embodiment of this application. The communication method further includes the following operations.

Operation S501: An M-AP sends a first response frame to a STA, so that the STA receives the first response frame.

In an embodiment, after receiving a second request frame, the M-AP may send the first response frame to the STA in a DTI or a Grant period.

The first response frame is for responding to the first request frame. The first response frame carries reply information, and the reply information is for replying to a service demand indicated by the first request frame. The first response frame may have another name, for example, a DMG New Grant Frame. This is not limited in embodiments of this application.

Figure 23:
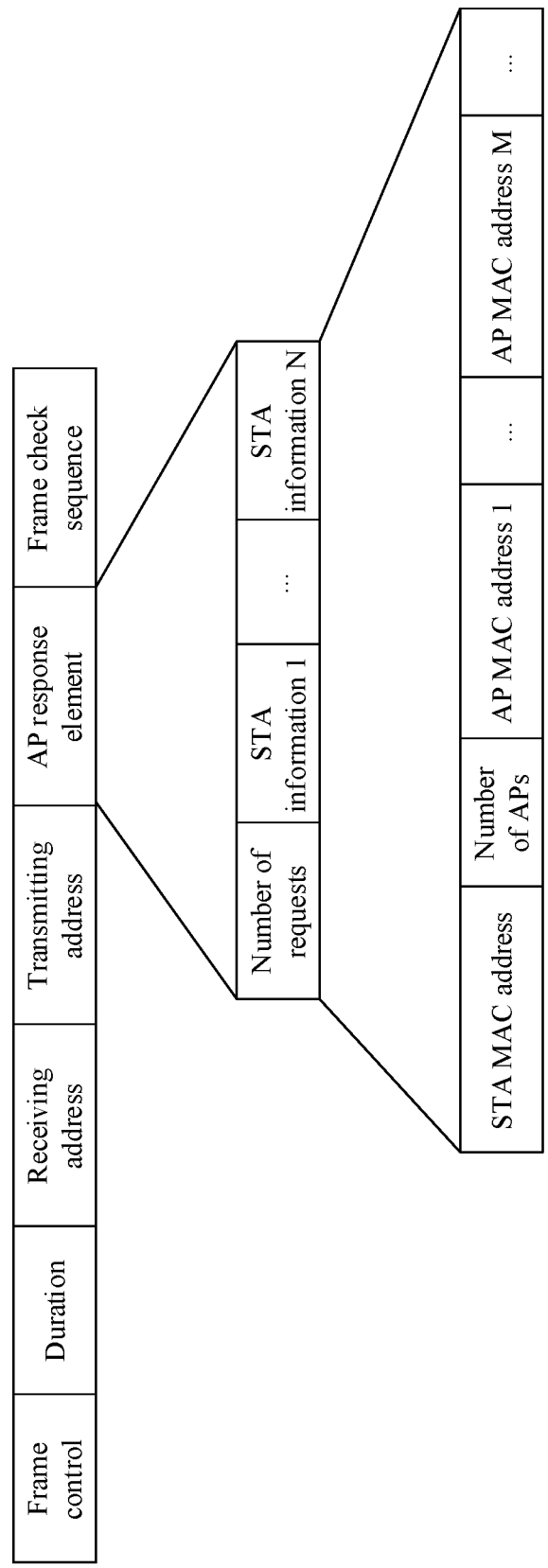
FIG. 23 is a schematic diagram depicting a frame structure of a first response frame according to an embodiment of this application.

For example, as shown in FIG. 23, the first response frame includes a frame control field, a duration field, a receiving address, a transmitting address, an AP response element field, and a frame check sequence.

The AP response element field includes a number of requests and one or more STA information.

The number of requests indicates a quantity of STAs that send the first request frame.

The STA information includes a STA MAC address, a number of APs, and one or more AP MAC addresses. The number of APs indicates a quantity of APs that serve the STA corresponding to the STA information. The one or more AP MAC addresses are one MAC address or MAC addresses of APs that serve the STA corresponding to the STA information.

The foregoing mainly describes the solutions provided in embodiments of this application from perspectives of the M-AP, the C-AP, and the STA. It may be understood that, to implement the foregoing functions, the M-AP, the C-AP, and the STA each include a hardware structure and/or software module for performing a corresponding function. A person skilled in the art should be easily aware that units, algorithms, and operations in the examples described with reference to embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the apparatus may be divided into functional modules based on the foregoing method examples. For example, each functional module may be obtained through division based on a corresponding function, or two or more functions may be integrated into one functional module. The integrated module may be implemented in a form of hardware, or may be implemented in a form of a software functional module. It should be noted that, in embodiments of this application, division into the modules is an example, and is merely a logical function division. In actual implementation, another division manner may be used. An example in which each function module is obtained through division based on each corresponding function is used below for description.

Figure 24:
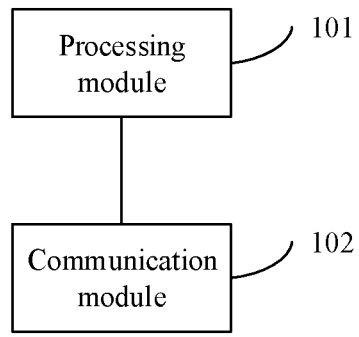
FIG. 24 is a schematic diagram depicting a structure of a communication apparatus according to an embodiment of this application.

FIG. 24 is a schematic diagram depicting a structure of a communication apparatus according to an embodiment of this application. The communication apparatus includes a processing module 101 and a communication module 102.

When the communication apparatus is a C-AP, the processing module 101 is configured to support the C-AP to perform operation S101 in FIG. 3, and another processing operation that should be performed by the C-AP in embodiments of this application. The communication module 102 is configured to support the C-AP to perform operation S102 in FIG. 3, operations S202 and S203 in FIG. 5, operations S302 and S303 in FIG. 12, operations S402 and S403 in FIG. 15, and another communication operation that should be performed by the C-AP in embodiments of this application.

When the communication apparatus is an M-AP, the processing module 101 is configured to support the M-AP to perform a procedure in an ATI. The communication module 102 is configured to support the M-AP to perform operation S102 in FIG. 3, operations S201 to S203 in FIG. 5, operations S301 to S303 in FIG. 12, operations S401 to S403 in FIG. 15, operation S501 in FIG. 22, and another communication operation that should be performed by the M-AP in embodiments of this application.

Figure 25:
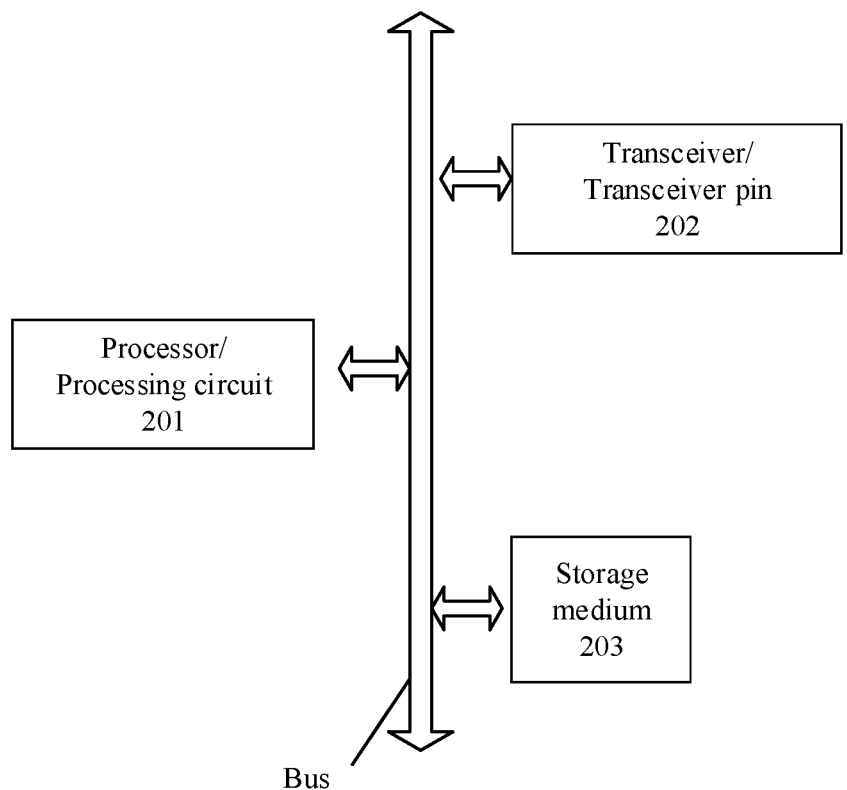
FIG. 25 is a schematic diagram depicting a structure of a communication apparatus according to an embodiment of this application.

FIG. 25 is a schematic diagram depicting a structure of a product form of a communication apparatus according to an embodiment of this application.

In an embodiment, the communication apparatus in this embodiment of this application may be a communication device, and the communication device includes a processor 201 and a transceiver 202. In an embodiment, the communication device further includes a storage medium 203.

When the communication apparatus is a C-AP, the processor 201 is configured to support the C-AP to perform operation S101 in FIG. 3, and another processing operation that should be performed by the C-AP in embodiments of this application. The transceiver 202 is configured to support the C-AP to perform operation S102 in FIG. 3, operations S202 and S203 in FIG. 5, operations S302 and S303 in FIG. 12, operations S402 and S403 in FIG. 15, and another communication operation that should be performed by the C-AP in embodiments of this application.

When the communication apparatus is an M-AP, the processor 201 is configured to support the M-AP to perform a procedure in an ATI. The transceiver 202 is configured to support the M-AP to perform operation S102 in FIG. 3, operations S201 to S203 in FIG. 5, operations S301 to S303 in FIG. 12, operations S401 to S403 in FIG. 15, operation S501 in FIG. 22, and another communication operation that should be performed by the M-AP in embodiments of this application.

In another embodiment, the communication apparatus described in this embodiment of this application may alternatively be implemented by a general-purpose processor or a special-purpose processor that is commonly referred to as a chip. The chip includes a processing circuit 201 and a transceiver pin 202. In an embodiment, the chip may further include a storage medium 203.

When the communication apparatus is a chip in a C-AP, the processing circuit 201 is configured to support the C-AP to perform operation S101 in FIG. 3, and another processing operation that should be performed by the C-AP in embodiments of this application. The transceiver pin 202 is configured to support the C-AP to perform operation S102 in FIG. 3, operations S202 and S203 in FIG. 5, operations S302 and S303 in FIG. 12, operations S402 and S403 in FIG. 15, and another communication operation that should be performed by the C-AP in embodiments of this application.

When the communication apparatus is a chip in an M-AP, the processing circuit 201 is configured to support the M-AP to perform a procedure in an ATI. The transceiver pin 202 is configured to support the M-AP to perform operation S102 in FIG. 3, operations S201 to S203 in FIG. 5, operations S301 to S303 in FIG. 12, operations S401 to S403 in FIG. 15, operation S501 in FIG. 22, and another communication operation that should be performed by the M-AP in embodiments of this application.

In another embodiment, the communication apparatus described in this embodiment of this application may alternatively be implemented by using the following circuit or component: one or more field programmable gate arrays (FPGA), programmable logic devices (PLD), controllers, state machines, logic gates, discrete hardware components, any other appropriate circuits, or any combination of circuits that can perform the functions described in this application.

It should be understood that the computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

The foregoing description about implementations allows a person skilled in the art to understand that, for the purpose of convenient and brief description, division into the foregoing functional modules is taken as an example for illustration. In actual application, the foregoing functions can be allocated to different modules and implemented as required, that is, an inner structure of an apparatus is divided into different functional modules to implement all or a part of the functions described above.

It should be understood that in the several embodiments provided in this application, the disclosed apparatuses and methods may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate components may or may not be physically separate, and components displayed as units may be one or more physical units, and may be located in one place, or may be distributed on a plurality of different places. A part or all of the units may be selected based on an actual requirement to achieve an objective of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or a part of the technical solutions may be implemented in a form of a software product. The software product is stored in a storage medium and includes several instructions for instructing a device (which may be a single-chip microcomputer, a chip, or the like) or a processor (processor) to perform all or a part of the operations of the methods in embodiments of this application.

The foregoing description is merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method of wireless communication by a first access point (AP), comprising:
   transmitting, to a plurality of second APs, a first indication frame, wherein the first indication frame comprises:
      indication information for an interaction procedure between the first AP, one of the plurality of second APs, and a station (STA) in an announcement transmission interval (ATI), and
      scheduling mode indication information indicating a scheduling mode, and different scheduling modes correspond to different interaction procedures, the scheduling mode comprising a first scheduling mode, a second scheduling mode, and a third scheduling mode, wherein based on the first scheduling mode, the interaction procedure comprises:
         receiving, by each of the plurality of second APs in a corresponding first time period, one or more first request frames sent by one or more STAs; sending, by each of the plurality of second APs, a second request frame to the first AP in a second time period; and sending, by the first AP, a second response frame to each of the plurality of second APs in the second time period; and
   receiving a second request frame from the one of the plurality of second APs after the one of the plurality of second APs receives a first request frame from the STA based on the indication information.

2. The communication method according to claim 1, wherein the first request frame indicates a service demand of the STA that sends the first request frame, the second request frame indicates one or more service demands of the one or more STAs, and the second response frame is for responding to the second request frame.

3. The communication method according to claim 2, wherein the first indication frame further comprises a plurality of pieces of AP scheduling information, and the plurality of pieces of AP scheduling information respectively correspond to the plurality of second APs; and
   the AP scheduling information comprises an association identifier (AID), first indication information, a start time of the first time period, duration of the first time period, second indication information, a start time of the second time period, and duration of the second time period, wherein the first indication information indicates whether the second AP obtains the first request frame in a polling manner, and the second indication information indicates whether the first AP obtains the second request frame in a polling manner.

4. The communication method according to claim 1, wherein based on the second scheduling mode, the interaction procedure between the first AP, a second AP, and a STA comprises: receiving, by the second AP in a corresponding first time period, a first request frame sent by the STA; sending, by the second AP, a second request frame to the first AP in the corresponding first time period; and sending, by the first AP, a second response frame each time after receiving a second request frame, wherein
   the first request frame indicates a service demand of the STA that sends the first request frame, the second request frame indicates one or more service demands of one or more STAs, and the second response frame is for responding to the second request frame.

5. The communication method according to claim 1, wherein based on the third scheduling mode, the interaction procedure between the first AP, a second AP, and a STA comprises: receiving, by the second AP in a corresponding first time period, a first request frame sent by the STA; sending, by the second AP, a second request frame to the first AP in the corresponding first time period; and sending, by the first AP, a second response frame in a second time period, wherein
   the first request frame indicates a service demand of the STA that sends the first request frame, the second request frame indicates one or more service demands of one or more STAs, and the second response frame is for responding to the second request frame.

6. The communication method according to claim 4, wherein the first indication frame further comprises a plurality of pieces of AP scheduling information, and the plurality of pieces of AP scheduling information respectively correspond to the plurality of second APs; and
   the AP scheduling information comprises an association identifier (AID), first indication information, a start time of the first time period, and duration of the first time period, wherein the first indication information indicates whether the second AP obtains the first request frame in a polling manner.

7. A communication method of wireless communication by a second access point (AP), comprising:
   receiving, from a first AP, a first indication frame, wherein the first indication frame comprises:
      indication information for an interaction procedure between the first AP, the second AP, and a station (STA) in an announcement transmission interval (ATI), and
      scheduling mode indication information indicating a scheduling mode, and different scheduling modes correspond to different interaction procedures, the scheduling mode comprising a first scheduling mode, a second scheduling mode, and a third scheduling mode, wherein based on the first scheduling mode, the interaction procedure between the first AP, the second AP, and a STA comprises:
         receiving, by the second AP in a corresponding first time period, one or more first request frames sent by one or more STAs; sending, by the second AP, a second request frame to the first AP in a second time period; and sending, by the first AP, a second response frame to the second AP in the second time period;
   receiving a first request frame from the STA based on the indication information; and
   transmitting, to the first AP, a second request frame in response to the first request frame.

8. The communication method according to claim 7, wherein
   the first request frame indicates a service demand of the STA that sends the first request frame, the second request frame indicates one or more service demands of the one or more STAs, and the second response frame is for responding to the second request frame.

9. The communication method according to claim 8, wherein the first indication frame further comprises a plurality of pieces of AP scheduling information, and the plurality of pieces of AP scheduling information respectively correspond to a plurality of second APs; and
the AP scheduling information comprises an association identifier (AID), first indication information, a start time of the first time period, duration of the first time period, second indication information, a start time of the second time period, and duration of the second time period, wherein the first indication information indicates whether the second AP obtains the first request frame in a polling manner, and the second indication information indicates whether the first AP obtains the second request frame in a polling manner.

10. The communication method according to claim 7, wherein based on the second scheduling mode, the interaction procedure between the first AP, the second AP, and a STA comprises: receiving, by the second AP in a corresponding first time period, a first request frame sent by the STA; sending, by the second AP, a second request frame to the first AP in the corresponding first time period; and sending, by the first AP, a second response frame each time after receiving a second request frame, wherein
the first request frame indicates a service demand of the STA that sends the first request frame, the second request frame indicates one or more service demands of one or more STAs, and the second response frame is for responding to the second request frame.

11. The communication method according to claim 7, wherein based on the third scheduling mode, the interaction procedure between the first AP, the second AP, and a STA comprises: receiving, by the second AP in a corresponding first time period, a first request frame sent by the STA; sending, by the second AP, a second request frame to the first AP in the corresponding first time period; and sending, by the first AP, a second response frame in a second time period, wherein
the first request frame indicates a service demand of the STA that sends the first request frame, the second request frame indicates one or more service demands of one or more STAs, and the second response frame is for responding to the second request frame.

12. The communication method according to claim 10, wherein the first indication frame further comprises a plurality of pieces of AP scheduling information, and the plurality of pieces of AP scheduling information respectively correspond to a plurality of member APs including the second AP; and
the AP scheduling information comprises an association identifier (AID), first indication information, a start time of the first time period, and duration of the first time period, wherein the first indication information indicates whether the second AP obtains the first request frame in a polling manner.

13. The communication method according to claim 8, wherein the method further comprises:
sending, by the second AP, a first response frame to the STA, wherein the first response frame is for responding to the first request frame, the first response frame comprises a plurality of pieces of STA information, the plurality of pieces of STA information respectively correspond to a plurality of STAs, and the STA information indicates an address of each AP that serves a STA corresponding to the STA information.

14. A communication apparatus of a first access point (AP), comprising:
a processing module, configured to:
generate a first indication frame comprising:
indication information for an interaction procedure between the first AP, a plurality of second APs, and a station (STA) in an announcement transmission interval (ATI), and
scheduling mode indication information indicating a scheduling mode, and different scheduling modes correspond to different interaction procedures, the scheduling mode comprising a first scheduling mode, a second scheduling mode, and a third scheduling mode, wherein based on the first scheduling mode, the interaction procedure between the first AP, a second AP, and a STA comprises:
receiving, by each of the plurality of second APs in a corresponding first time period, one or more first request frames sent by one or more STAs; sending, by each of the plurality of second APs, a second request frame to the first AP in a second time period; and sending, by the first AP, a second response frame to each of the plurality of second APs in the second time period; and
a communication module, configured to:
send the first indication frame to the plurality of second APs; and
receive a request frame from one of the plurality of second APs after the one of the plurality of second APs receives a first request frame from the STA.

15. The communication apparatus according to claim 14, wherein
the first request frame indicates a service demand of the STA that sends the first request frame, the second request frame indicates one or more service demands of the one or more STAs, and the second response frame is for responding to the second request frame.

16. The communication apparatus according to claim 14, wherein the first indication frame further comprises a plurality of pieces of AP scheduling information, and the plurality of pieces of AP scheduling information respectively correspond to a plurality of second APs; and
the AP scheduling information comprises an association identifier (AID), first indication information, a start time of the first time period, duration of the first time period, second indication information, a start time of the second time period, and duration of the second time period, wherein the first indication information indicates whether the second AP obtains the first request frame in a polling manner, and the second indication information indicates whether the first AP obtains the second request frame in a polling manner.

17. The communication apparatus according to claim 14, wherein based on the second scheduling mode, the interaction procedure between the first AP, the second AP, and a STA comprises: receiving, by the second AP in a corresponding first time period, a first request frame sent by the STA; sending, by the second AP, a second request frame to the first AP in the corresponding first time period; and sending, by the first AP, a second response frame each time after receiving a second request frame, wherein
the first request frame indicates a service demand of the STA that sends the first request frame, the second request frame indicates one or more service demands of one or more STAs, and the second response frame is for responding to the second request frame.

18. The communication apparatus according to claim 14, wherein based on the third scheduling mode, the interaction procedure between the first AP, the second AP, and a STA comprises: receiving, by the second AP in a corresponding first time period, a first request frame sent by the STA; sending, by the second AP, a second request frame to the first AP in the corresponding first time period; and sending, by the first AP, a second response frame in a second time period, wherein the first request frame indicates a service demand of the STA that sends the first request frame, the second request frame indicates one or more service demands of one or more STAs, and the second response frame is for responding to the second request frame.

19. The communication apparatus according to claim 14, wherein the first indication frame further comprises a plurality of pieces of AP scheduling information, and the plurality of pieces of AP scheduling information respectively correspond to a plurality of member APs including the second AP; and the AP scheduling information comprises an association identifier (AID), first indication information, a start time of the first time period, and duration of the first time period, wherein the first indication information indicates whether the second AP obtains the first request frame in a polling manner.

\* \* \* \* \*